United States Patent
Ohishi et al.

(10) Patent No.: US 10,170,969 B2
(45) Date of Patent: Jan. 1, 2019

(54) POWER GENERATION DEVICE

(71) Applicant: Panasonic Intellectual Property Management Co., Ltd., Osaka (JP)

(72) Inventors: Suguru Ohishi, Osaka (JP); Kensuke Toda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 429 days.

(21) Appl. No.: 14/911,258

(22) PCT Filed: Nov. 4, 2014

(86) PCT No.: PCT/JP2014/005539
§ 371 (c)(1),
(2) Date: Feb. 9, 2016

(87) PCT Pub. No.: WO2015/068377
PCT Pub. Date: May 14, 2015

(65) Prior Publication Data
US 2016/0190903 A1 Jun. 30, 2016

(30) Foreign Application Priority Data
Nov. 7, 2013 (JP) .................................. 2013-230939

(51) Int. Cl.
*H02K 35/06* (2006.01)
*H02K 35/04* (2006.01)
*H02K 7/18* (2006.01)

(52) U.S. Cl.
CPC ........... *H02K 35/06* (2013.01); *H02K 7/1876* (2013.01); *H02K 35/04* (2013.01)

(58) Field of Classification Search
CPC ......... H02K 35/03; H02K 35/06; H02K 35/02
See application file for complete search history.

(56) References Cited

U.S. PATENT DOCUMENTS 5,909,068 A * 6/1999 Wakiwaka ............. H02K 33/16
310/15
6,518,681 B2 * 2/2003 Ogino ....................... H01F 7/06
310/12.12

(Continued)

FOREIGN PATENT DOCUMENTS

JP 2011-120360 6/2011
JP 2011-160548 8/2011

(Continued)

OTHER PUBLICATIONS

International Search Report of PCT application No. PCT/JP2014/005539 dated Jan. 27, 2015.

*Primary Examiner* — Dang Le
(74) *Attorney, Agent, or Firm* — McDermott Will & Emery LLP

(57) ABSTRACT

A power generation device of the present invention includes: a first magnet member; a second magnet member having its N-pole reversely disposed to an N-pole of the first magnet member; a center yoke capable of horizontally shifting and disposed between the first magnet member and the second magnet member; a coil disposed at the outer circumference of the center yoke; and a drive member horizontally shifting while holding the first magnet member and the second magnet member. The drive member and the center yoke horizontally shift in a first direction. After the horizontal shift of the center yoke in the first direction stops, the drive member further horizontally shifts in the first direction, and the center yoke horizontally shifts in a second direction opposite to the first direction.

5 Claims, 19 Drawing Sheets

(56) References Cited

U.S. PATENT DOCUMENTS

2010/0327672 A1* 12/2010 Roberts .................. H02K 1/34
                                                                           310/25
2014/0285296 A1    9/2014 Nagahara et al.

FOREIGN PATENT DOCUMENTS

| JP | 2013-135566 | 7/2013 |
| WO | 2013/084409 | 6/2013 |

\* cited by examiner

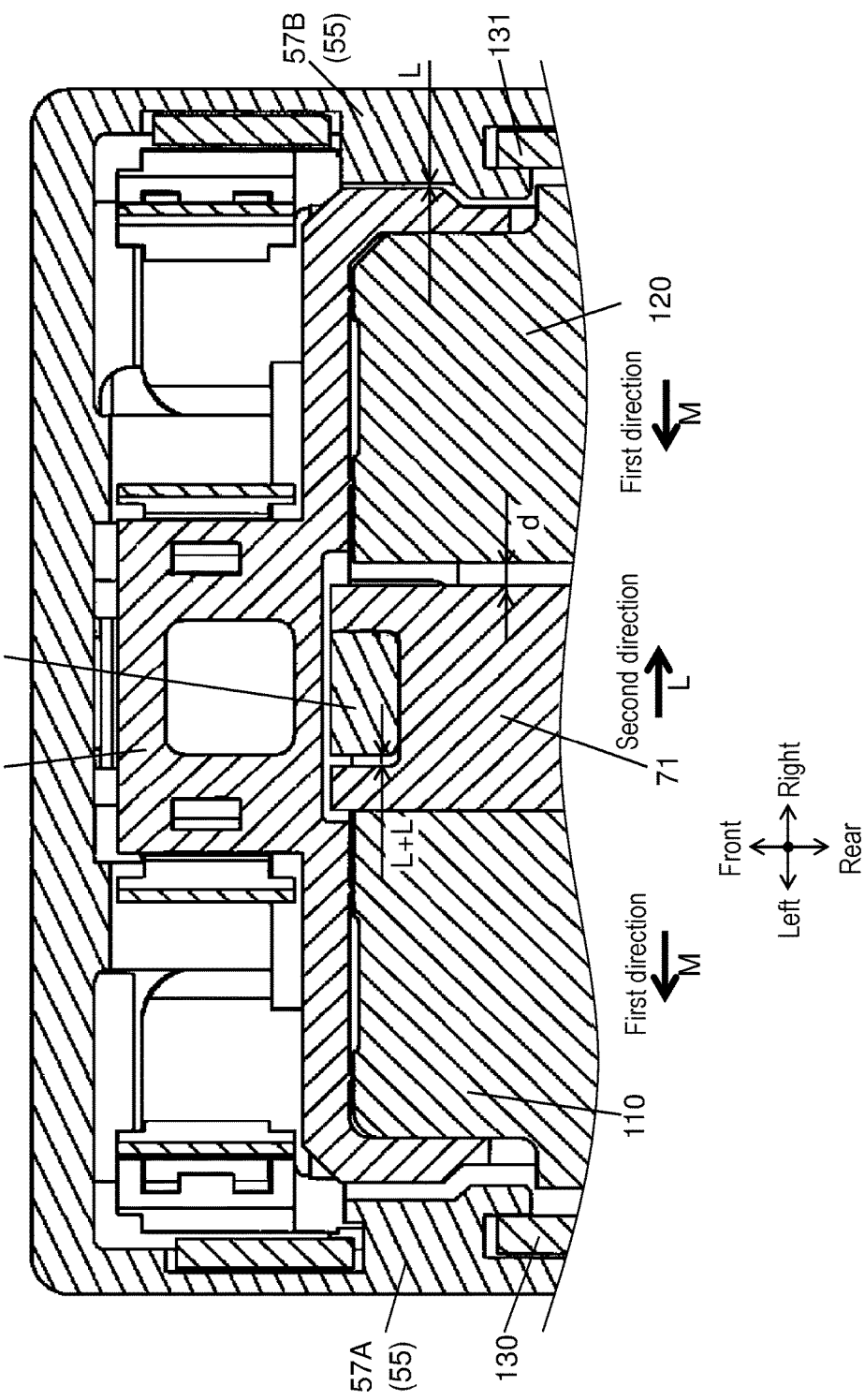

— 1 —

POWER GENERATION DEVICE

CROSS-REFERENCE TO RELATED APPLICATIONS

This application is a U.S. national stage application of the PCT International Application No. PCT/JP2014/005539 filed on Nov. 4, 2014, which claims the benefit of foreign priority of Japanese patent application 2013-230939 filed on Nov. 7, 2013, the contents all of which are incorporated herein by reference.

TECHNICAL FIELD

The present invention relates to a power generation device used in various electronic devices, and in an operational device and an operational component for remotely controlling the electronic devices.

BACKGROUND ART

In recent years, there has been an increasing demand for development of a compact power generation device in connection with various electronic devices, and with an operational device and an operational component for remotely controlling the electronic devices.

With reference to FIGS. 15 to 22, a description will be given of a conventional power generation device.

FIG. 15 is an exterior perspective view of a conventional power generation device. FIG. 16 is an exploded perspective view of the conventional power generation device. FIG. 17 is a perspective view of a fixed-side component of the conventional power generation device. FIG. 18 is a perspective view of a movable-side component of the conventional power generation device. FIG. 19 is a top view showing the first state of the conventional power generation device. Note that, in FIG. 19, cover member 27 is removed. FIG. 20 is a schematic diagram showing the positional relationship between magnet members and yokes in the first state of the conventional power generation device. FIG. 21 is a top view showing the second state of the conventional power generation device. Note that, in FIG. 21, cover member 27 is removed. FIG. 22 is a schematic diagram showing the positional relationship between the magnet members and the yokes in the second state of the conventional power generation device.

As shown in FIG. 15, the conventional power generation device is structured by a combination of resin-made case 31 and cover member 27.

As shown in FIGS. 16 and 17, case 31 is box-shaped, with its top side opened in a quadrangular shape. In case 31, bar-like center yoke 41 made of a magnetic body is fixed. Note that, in the following description, the direction along the longitudinal direction of center yoke 41 is defined as the front-rear direction, and the direction perpendicular to the front-rear direction in a plan view is defined as the right-left direction.

The center yoke 41 is fixed along the front-rear direction at around the center of the recess of case 31 (see FIG. 17 and others). The two ends of center yoke 41 (front end 42 and rear end 43) are each formed into a quadrangular prism wider than the intermediate part.

To the left end in case 31, first auxiliary yoke 1 being U-shaped as seen from above is fixed. Further, to the right end in case 31, second auxiliary yoke 2 being U-shaped as seen from above is fixed. Tip 1A and tip 1B of the U-shape of first auxiliary yoke 1 are respectively disposed at a prescribed interval from the left side surface of front end 42 of center yoke 41 and from the left side surface of rear end 43 of center yoke 41. Similarly, tips 2A and 2B of the U-shape of second auxiliary yoke 2 are respectively disposed at a prescribed interval from the right side surface of front end 42 of center yoke 41 and from the right side surface of rear end 43 of center yoke 41. The components on the case 31 side are structured as above.

With reference to FIG. 18, a description will be given of the components on the drive member 21 side that slidably shift relative to case 31. The main part that slidably shifts is structured by first magnet member 4, second magnet member 8, and drive member 21 that holds first magnet member 4 and second magnet member 8. Drive member 21 is a quadrangular resin-made frame.

First magnet member 4 is structured by permanent magnet 5 and quadrangular prism-like magnetic bodies 6, 7 respectively fixed to the front and rear surfaces of permanent magnet 5. Permanent magnet 5 is disposed having the N-pole positioned on the front side, and the S-pole on the rear side. Second magnet member 8 is structured by permanent magnet 9 and quadrangular prism-like magnetic bodies 10, 11 respectively fixed to the front and rear surfaces of permanent magnet 9. Permanent magnet 9 is disposed having the S-pole on the front side, and the N-pole on the rear side.

First magnet member 4 and second magnet member 8 are disposed in parallel to each other at a prescribed interval in drive member 21.

Drive member 21 can slidably shift in the right-left direction in case 31. In the state where drive member 21 is installed in case 31, as shown in FIGS. 19 and 21, center yoke 41 is positioned between first magnet member 4 and second magnet member 8. Further, first auxiliary yoke 1 is positioned on the left side of first magnet member 4, and second auxiliary yoke 2 is positioned on the right side of second magnet member 8. Then, at drive member 21, operational member 25 is disposed via leaf spring 23.

Then, resin-made cover member 27 is disposed from above so as to cover case 31 and drive member 21. Cover member 27 is coupled to case 31.

Next, with reference to FIGS. 19 to 22, a description will be given of the operation of the conventional power generation device. FIGS. 19 and 20 show the first state, and FIG. 20 is a schematic diagram showing the positional relationship. FIGS. 21 and 22 show the second state, and FIG. 22 is a schematic diagram showing the positional relationship.

<First State>

As shown in FIGS. 19 and 20, in the first state, first magnet member 4 and center yoke 41 abut on each other and stick to each other. Drive member 21 is positioned on the right side in case 31. The right side surface of the front end of magnetic body 6 abuts on the left side surface of front end 42 of center yoke 41 and sticks thereto, and the right side surface of the rear end of magnetic body 7 abuts on the left side surface of rear end 43 of center yoke 41 and sticks thereto. At this time, first magnet member 4 is spaced apart from tips 1A, 1B of first auxiliary yoke 1. Further, second magnet member 8 is spaced apart from the right side surfaces of front end 42 and rear end 43 of center yoke 41, and the right side surface of the front end of magnetic body 10 abuts on tip 2A of second auxiliary yoke 2 and sticks thereto, while the right side surface of the rear end of magnetic body 11 abuts on tip 2B of second auxiliary yoke 2 and sticks thereto.

In the first state, the magnetic flux from permanent magnet 5 flows via the route from magnetic body 6 to front end 42 of center yoke 41, through inside center yoke 41 toward rear end 43, and returning from rear end 43 of center yoke 41 to magnetic body 7.

<Transition from First State to Second State>

When the operational part of operational member 25 is slidably shifted in the left direction from the first state, the sticking portion in the first state is separated. Then, with the assistance of the spring force of leaf spring 23, drive member 21 shifts leftward. In accordance with the shifting of drive member 21, first magnet member 4 and second magnet member 8 slidably shift leftward. The second state is shown in FIGS. 21 and 22.

<Second State>

In the second state, as shown in FIGS. 21 and 22, the left side surface of the front end of first magnet member 4 abuts on tip 1A of first auxiliary yoke 1 and sticks thereto, and the left side surface of the rear end of first magnet member 4 abuts on tip 1B of first auxiliary yoke 1 and sticks thereto.

In the second state, the magnetic flux from permanent magnet 9 flows via the route from magnetic body 11 to rear end 43 of center yoke 41, inside center yoke 41 toward front end 42, and returning from front end 42 of center yoke 41 to magnetic body 10.

When the state transitions from the first state to the second state, the direction of the magnetic flux flowing in center yoke 41 is switched to the reverse direction. By the switch in the flow of the magnetic flux, electromotive force is generated at coil 45 disposed around center yoke 41. Then, the electromotive force is extracted from the coil wire of coil 45.

Further, the operation in returning from the second state to the first state is similar to that in transitioning from the first state to the second state. Thus, when the state returns from the second state to the first state also, the direction of the magnetic flux flowing in center yoke 41 is switched to the reverse direction. By the switch in the flow of the magnetic flux, corresponding electromotive force generated at coil 45 can be extracted.

Note that, the prior technique document relating to the present invention is, for example, PTL 1.

CITATION LIST

Patent Literature

PTL 1: WO 2013/084409

SUMMARY OF THE INVENTION

An object of the present invention is to provide a power generation device having a magnetic circuit structuring unit with which great electromotive force can be obtained.

In order to achieve the object stated above, the present invention provides a power generation device including: a first magnet member; a second magnet member having its N-pole reversely disposed to an N-pole of the first magnet member; a center yoke capable of horizontally shifting and disposed between the first magnet member and the second magnet member; a coil disposed at an outer circumference of the center yoke; and a drive member horizontally shifting while holding the first magnet member and the second magnet member. The drive member and the center yoke horizontally shift in a first direction. After the horizontal shift of the center yoke in the first direction stops, the drive member further horizontally shifts in the first direction, and the center yoke horizontally shifts in a second direction opposite to the first direction.

With this structure, the power generation device of the present invention can reduce the time required for changing the flow of the magnetic flux of center yoke 70, and can easily obtain great electromotive force.

As has been described, with the present invention, a power generation device with which great electromotive force can be easily obtained can be provided.

BRIEF DESCRIPTION OF DRAWINGS

FIG. 9C is a partial enlarged view of FIG. 9A.

DETAILED DESCRIPTION OF THE PREFERRED EMBODIMENT

Figure 1:
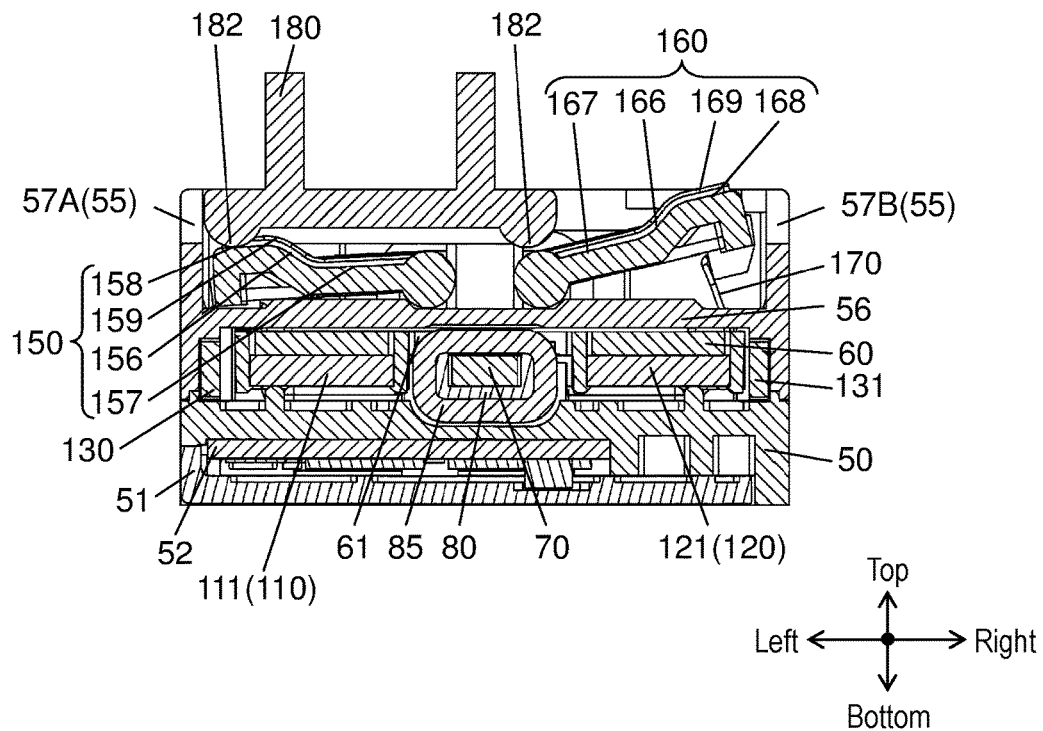
FIG. 1 is a cross-sectional view of a power generation device according to an exemplary embodiment of the present invention.

Prior to a description of the present exemplary embodiment, a description will be given of a problem associated with the above-described conventional power generation device. The conventional power generation device includes a magnetic circuit structuring unit that switches the direction of a magnetic flux flowing in center yoke 41 fixed to case 31 when the state transitions from the first state to the second state (or from the second state to the first state). The conventional power generation device obtains electromotive force in accordance with Faraday's law by the magnetic circuit structuring unit.

That is, electromotive force E is generally represented as follows:

E=N*($\Box\Box/\Box$t), where N is the number of turns of the coil

In connection with the conventional power generation device, in order to increase the electromotive force, it may be contemplated to increase the number of turns of coil 45. However, when the number of turns of coil 45 is increased, the space in which coil 45 is disposed cannot be secured, and the size of the power generation device disadvantageously increases.

Further, another method for increasing the electromotive force may be to employ permanent magnets with a great magnetic flux as permanent magnets 5, 9. By increasing the magnetic flux of permanent magnets 5, 9, a change in the magnetic flux flowing in center yoke 41 can be increased. However, for example in the first state, first magnet member 4 sticks to center yoke 41 fixed to case 31, and center yoke 41 is spaced apart from second magnet member 8. When the magnetic flux of permanent magnets 5, 9 is great, the distance between center yoke 41 and second magnet member 8 must be set to be great in order to avoid any influence of the reverse magnetic flux from second magnet member 8. That is, the distance between center yoke 41 and second magnet member 8 must be greater as the magnetic flux of permanent magnet 9 is greater. The same holds true for the second state.

Accordingly, in order to increase the number of turns of coil 45, to use permanent magnets 5, 9 with a great magnetic flux, or to obtain greater electromotive force, the size of the power generation device must be increased.

Therefore, the applicant proposes the present invention focusing on the problem described above.

In the following, with reference to FIGS. 1 to 14, a description will be given of an exemplary embodiment of the present invention.

Exemplary Embodiment

Figure 2:
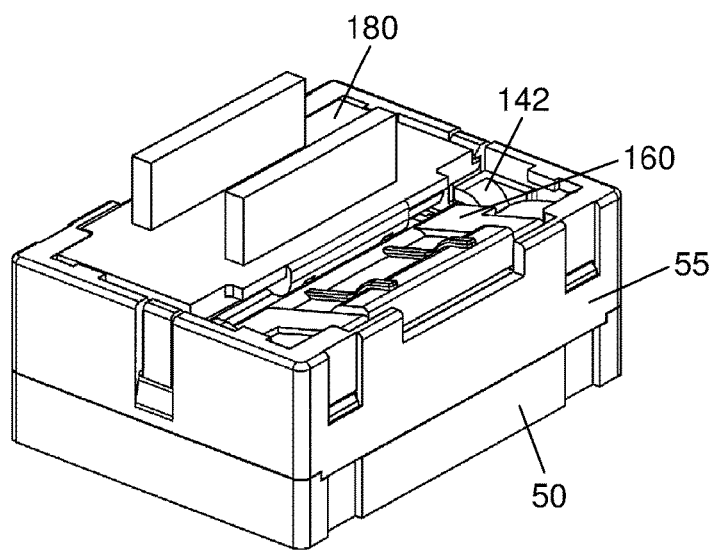
FIG. 2 is an exterior perspective view of the power generation device according to the exemplary embodiment of the present invention.
Figure 3:
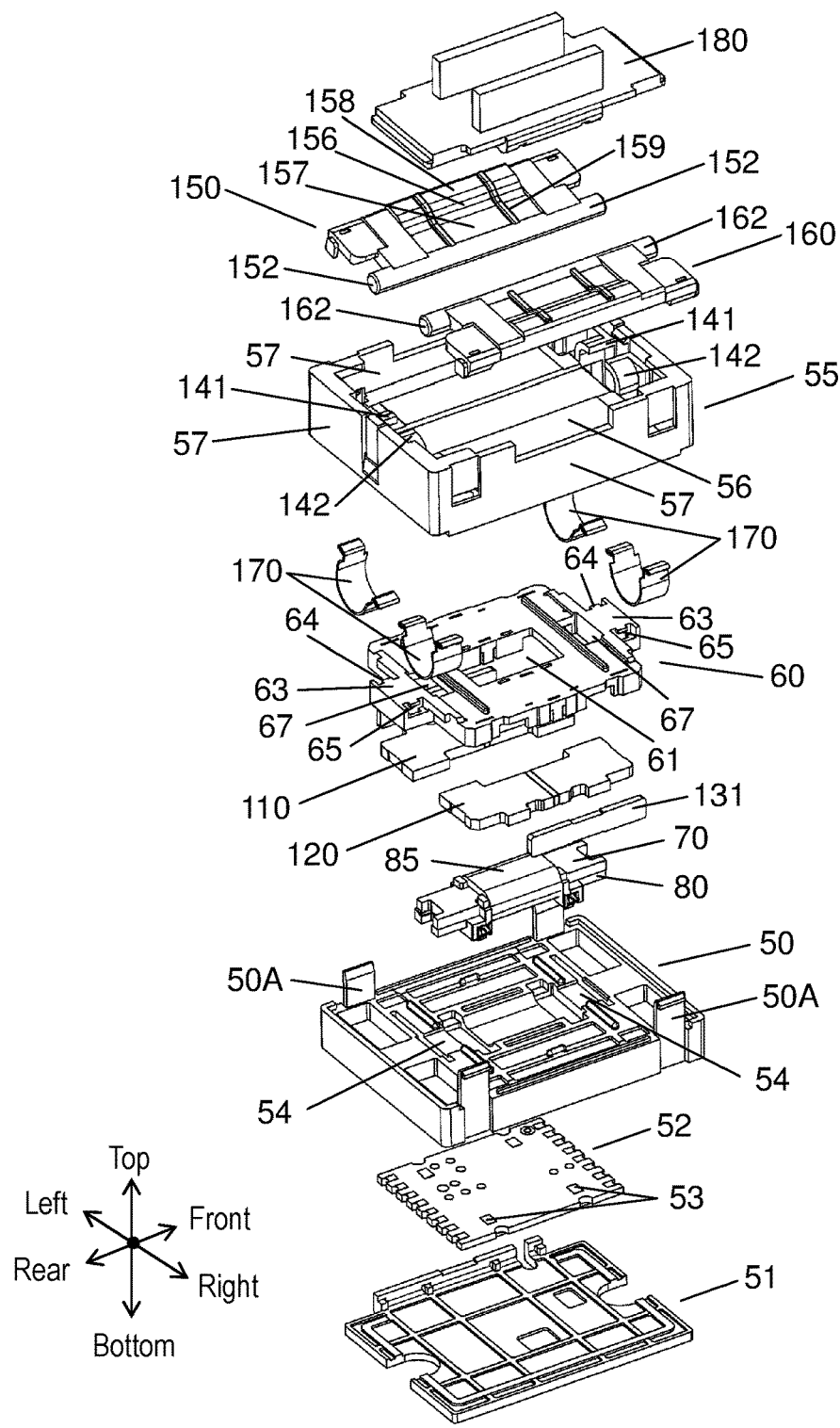
FIG. 3 is an exploded perspective view of the power generation device shown in FIG. 2.
Figure 4:
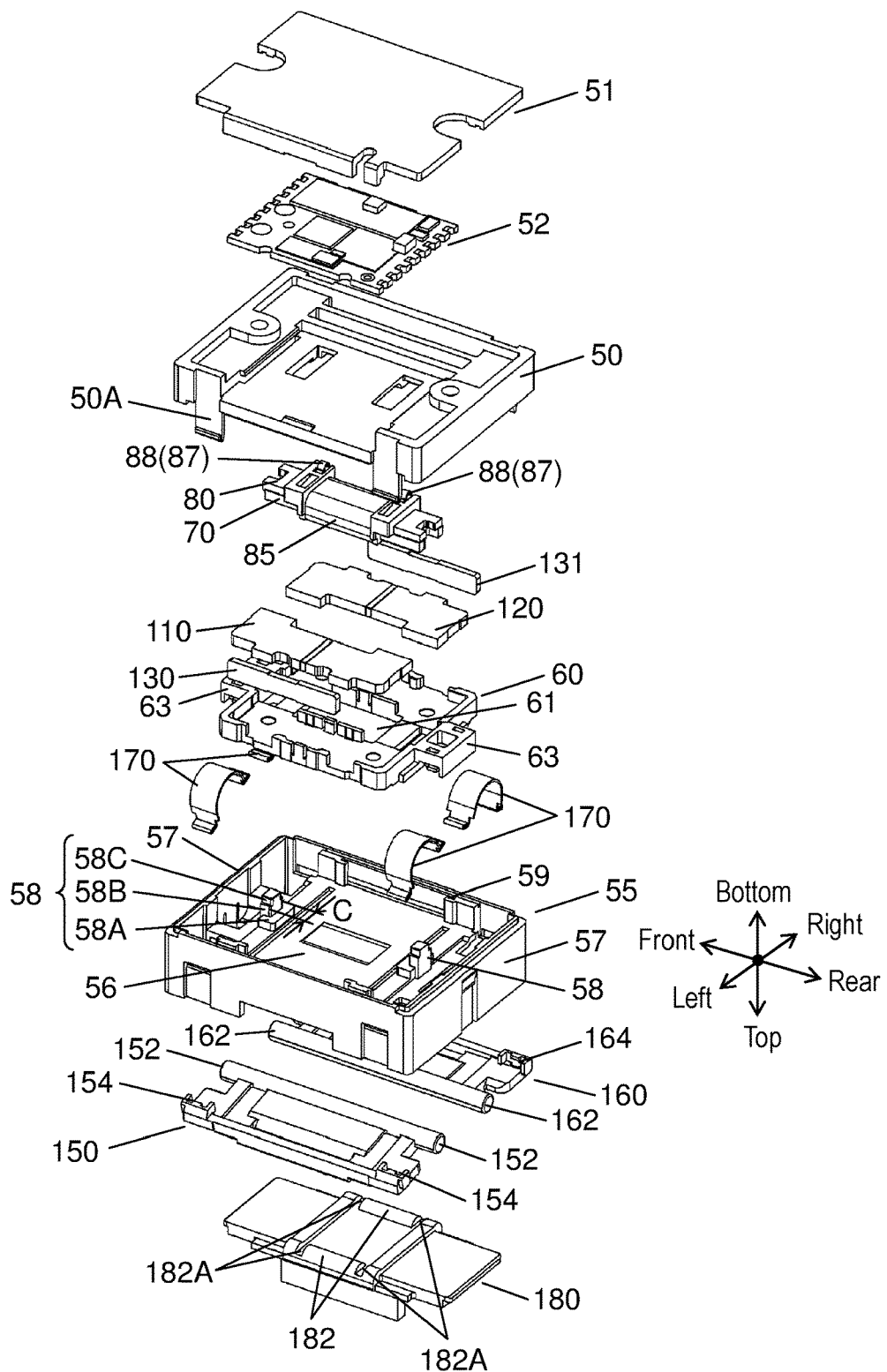
FIG. 4 is an exploded perspective view of the power generation device shown in FIG. 2 as seen from below.
Figure 5A:
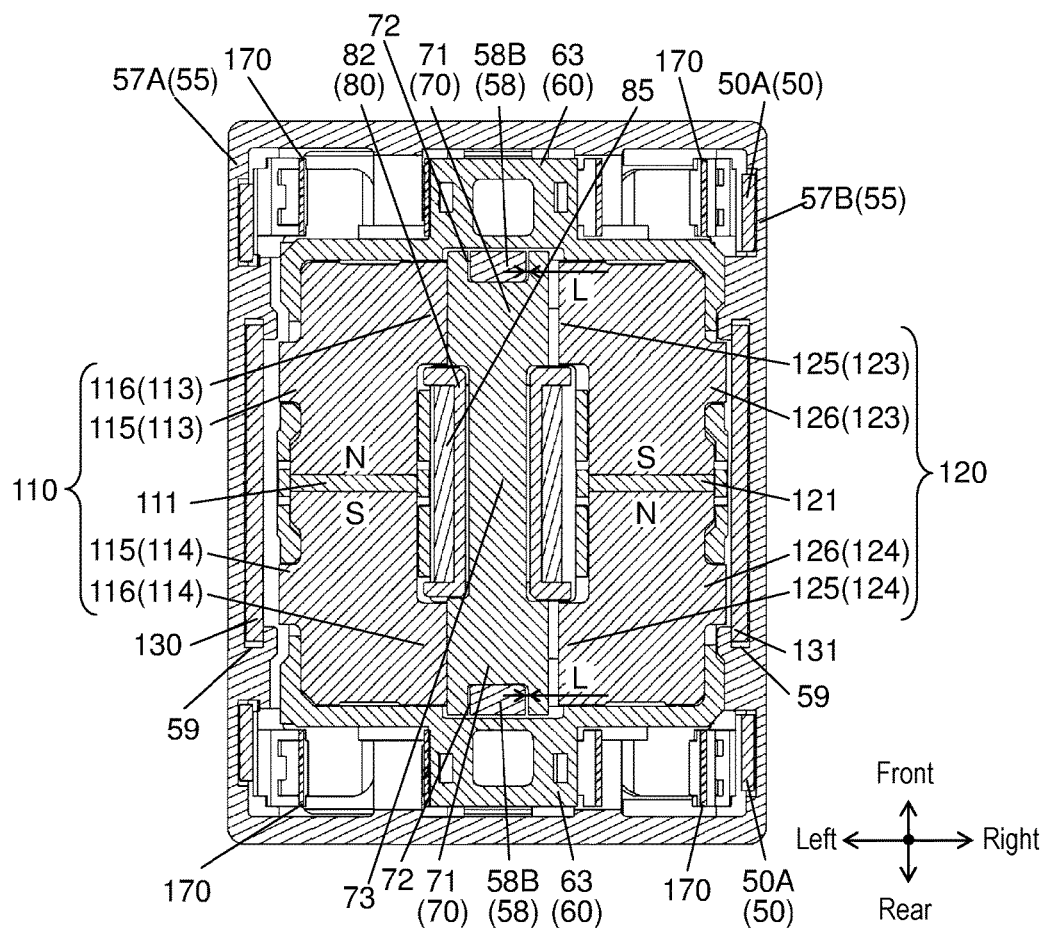
FIG. 5A is a cross-sectional view taken along the horizontal direction of the power generation device according to the exemplary embodiment of the present invention.
Figure 5B:
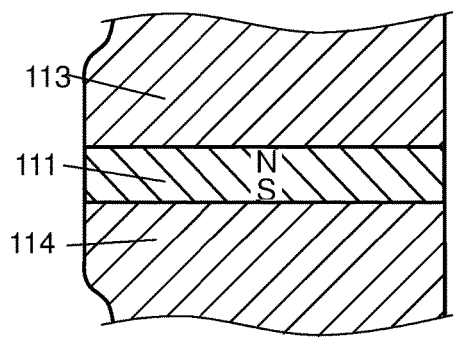
FIG. 5B is a partial enlarged view of a permanent magnet and magnetic bodies shown in FIG. 5A.
Figure 5C:
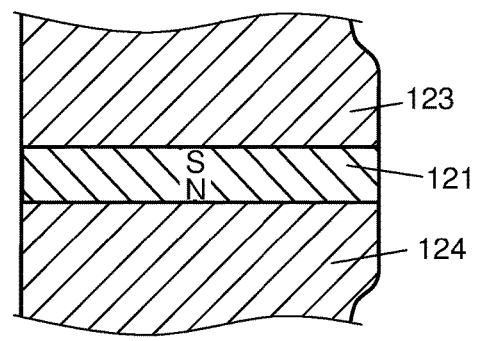
FIG. 5C is a partial enlarged view of the permanent magnet and the magnetic bodies shown in FIG. 5A.
Figure 5D:
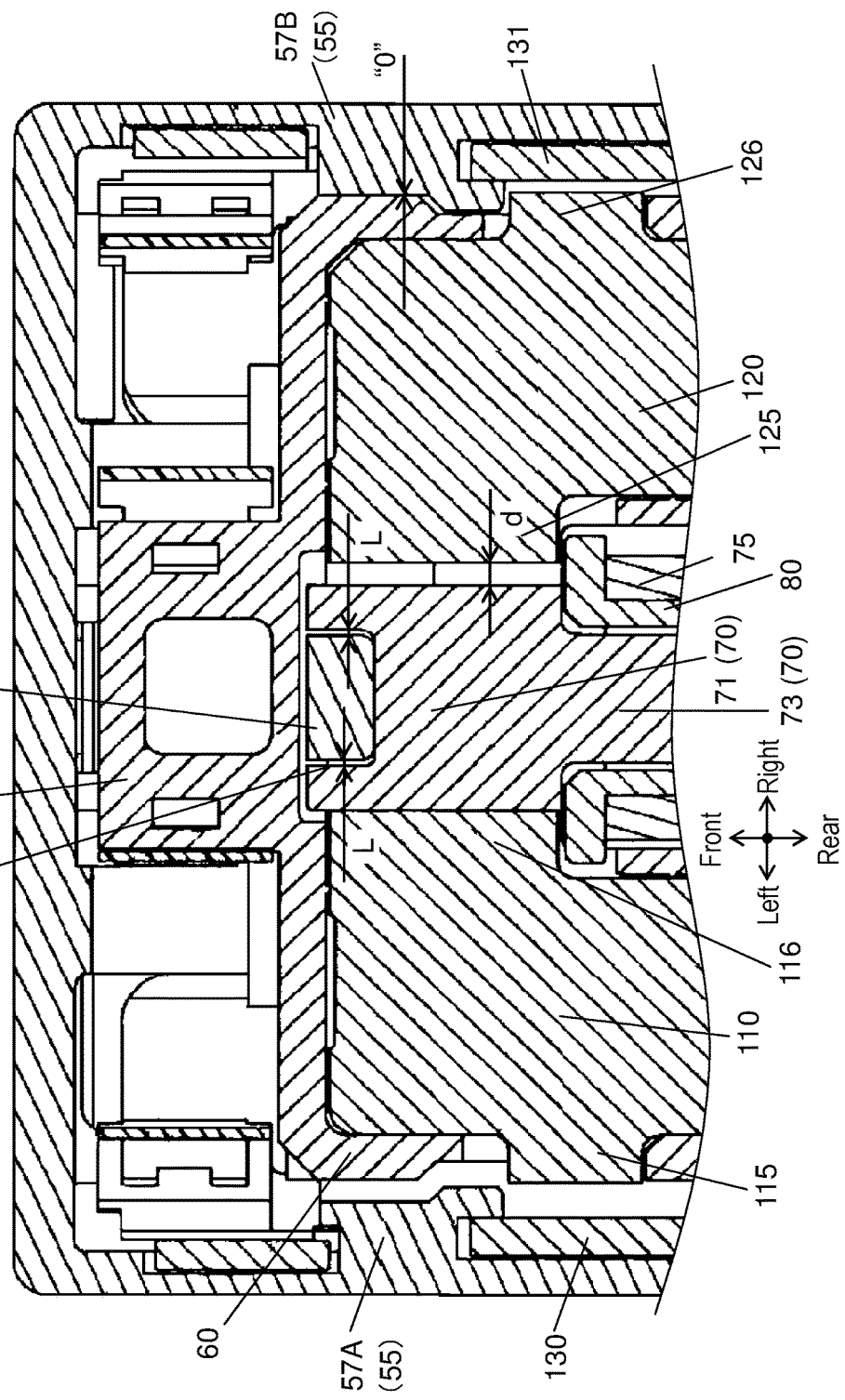
FIG. 5D is a partial enlarged view of FIG. 5A.
Figure 6:
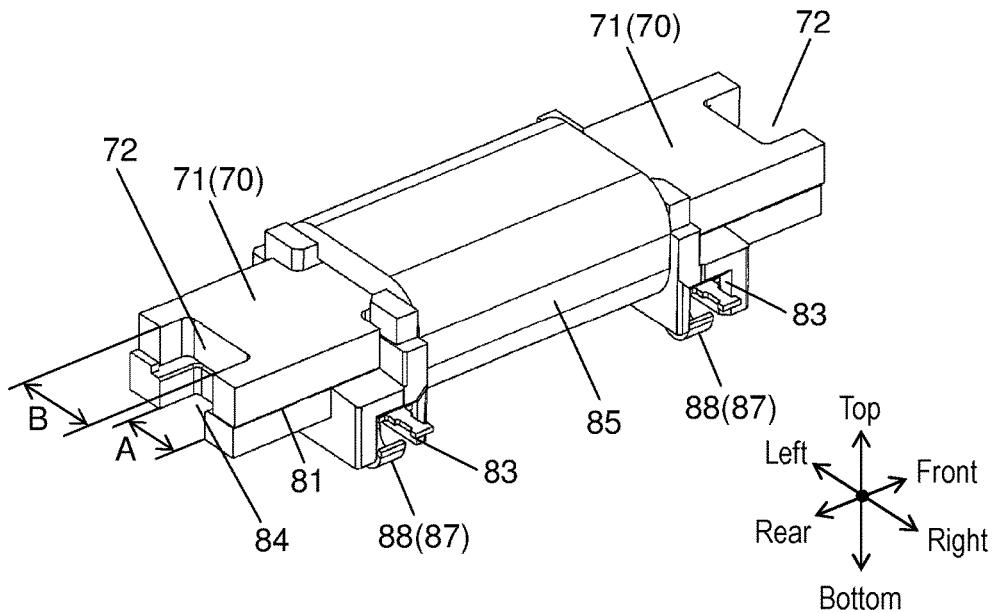
FIG. 6 is an exterior perspective view of a center yoke provided with a coil.
Figure 7:
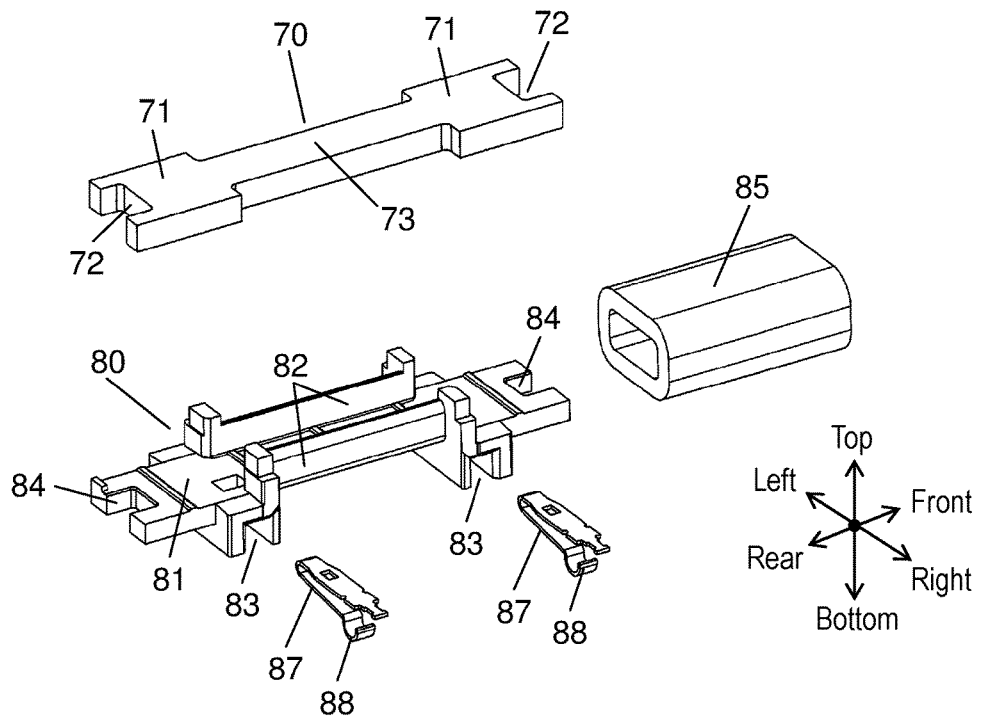
FIG. 7 is an exploded perspective view of FIG. 6.
Figure 8:
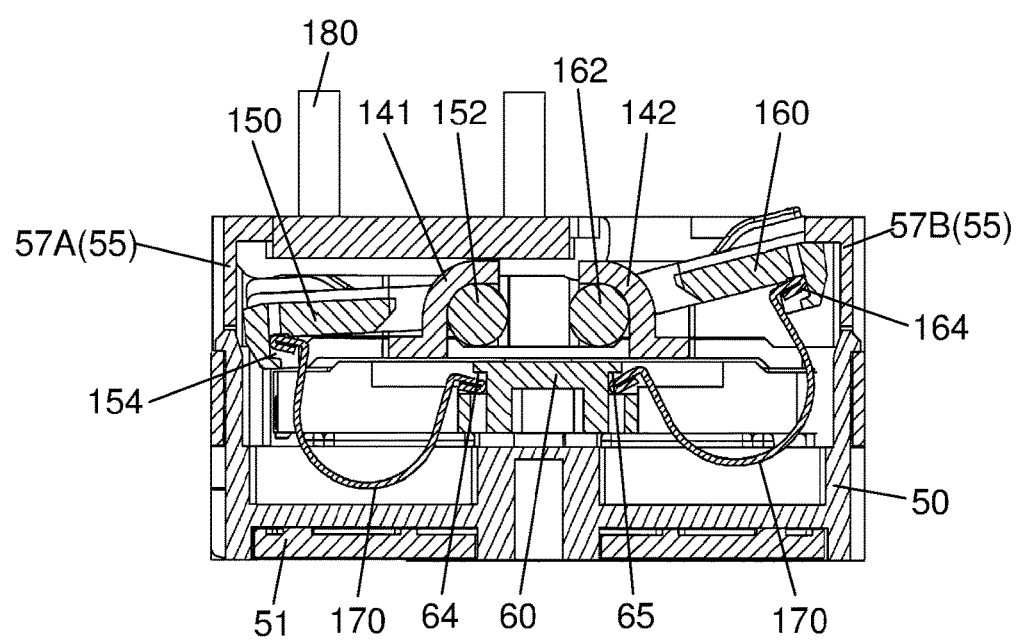
FIG. 8 is a cross-sectional view taken along the vertical direction of the power generation device in the first state.
Figure 8:
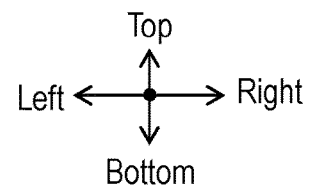
Figure 9A:
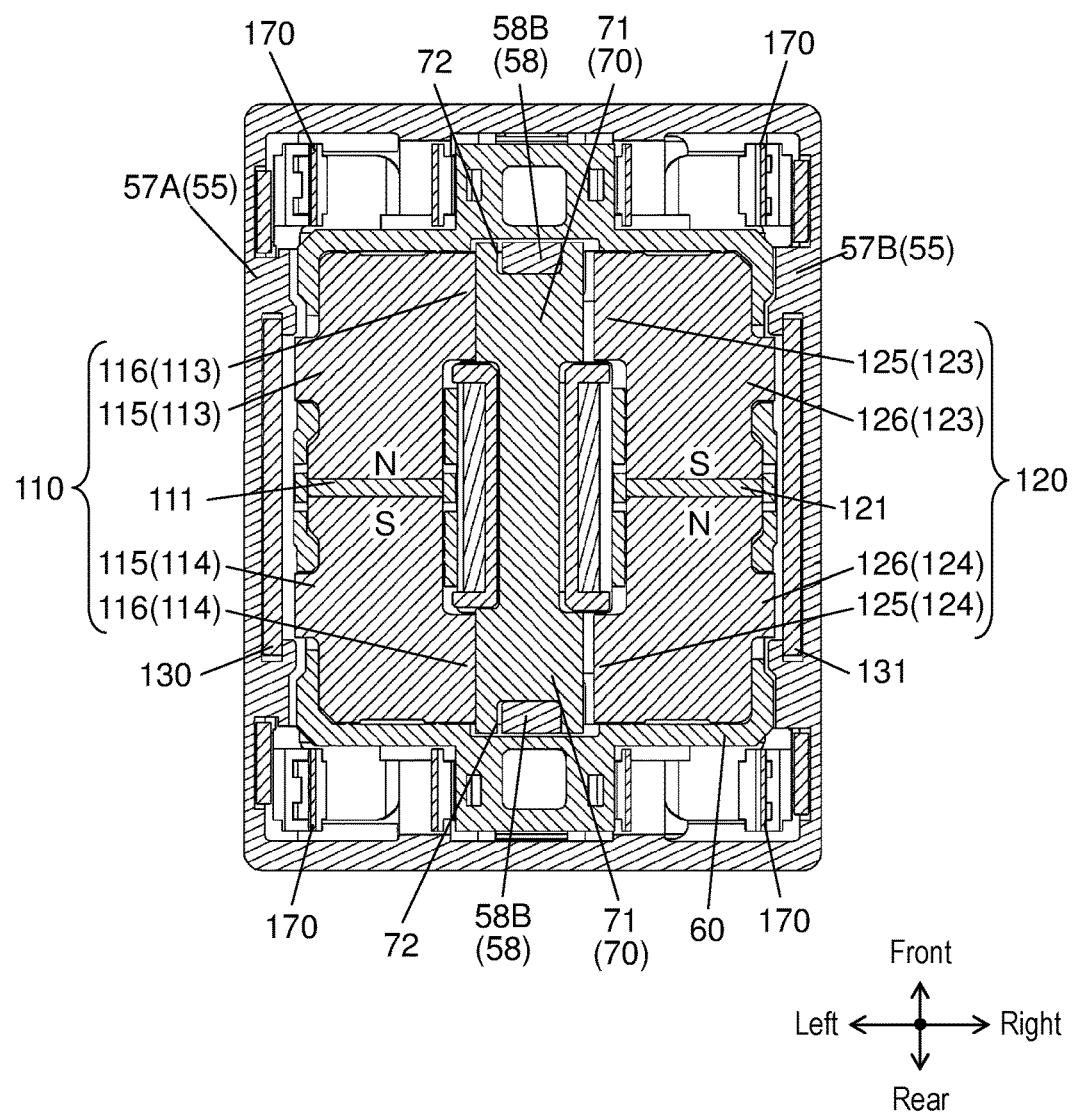
FIG. 9A is a cross-sectional view taken along the horizontal direction of the power generation device in the first state.

FIG. 1 is a cross-sectional view of a power generation device according to an exemplary embodiment of the present invention. FIG. 2 is an exterior perspective view of the power generation device according to the exemplary embodiment of the present invention. FIG. 3 is an exploded perspective view of the power generation device shown in FIG. 2. FIG. 4 is an exploded perspective view of the power generation device shown in FIG. 2 as seen from below. FIG. 5A is a cross-sectional view taken along the horizontal direction of the power generation device according to the present exemplary embodiment. Note that, FIG. 5A shows the first state. FIG. 5B is a partial enlarged view of permanent magnet 111, first magnetic body 113, and first magnetic body 114 shown in FIG. 5A. FIG. 5C is a partial enlarged view of permanent magnet 121, second magnetic body 123, and second magnetic body 124 shown in FIG. 5A. FIG. 5D is a partial enlarged view of FIG. 5A. FIG. 6 is an exterior perspective view of a center yoke provided with a coil. FIG. 7 is an exploded perspective view of the center yoke provided with the coil shown in FIG. 6. FIG. 8 is a cross-sectional view taken along the vertical direction of the power generation device in the first state. FIG. 9A is a cross-sectional view taken along the horizontal direction of the power generation device in the first state.

Figure 9B:
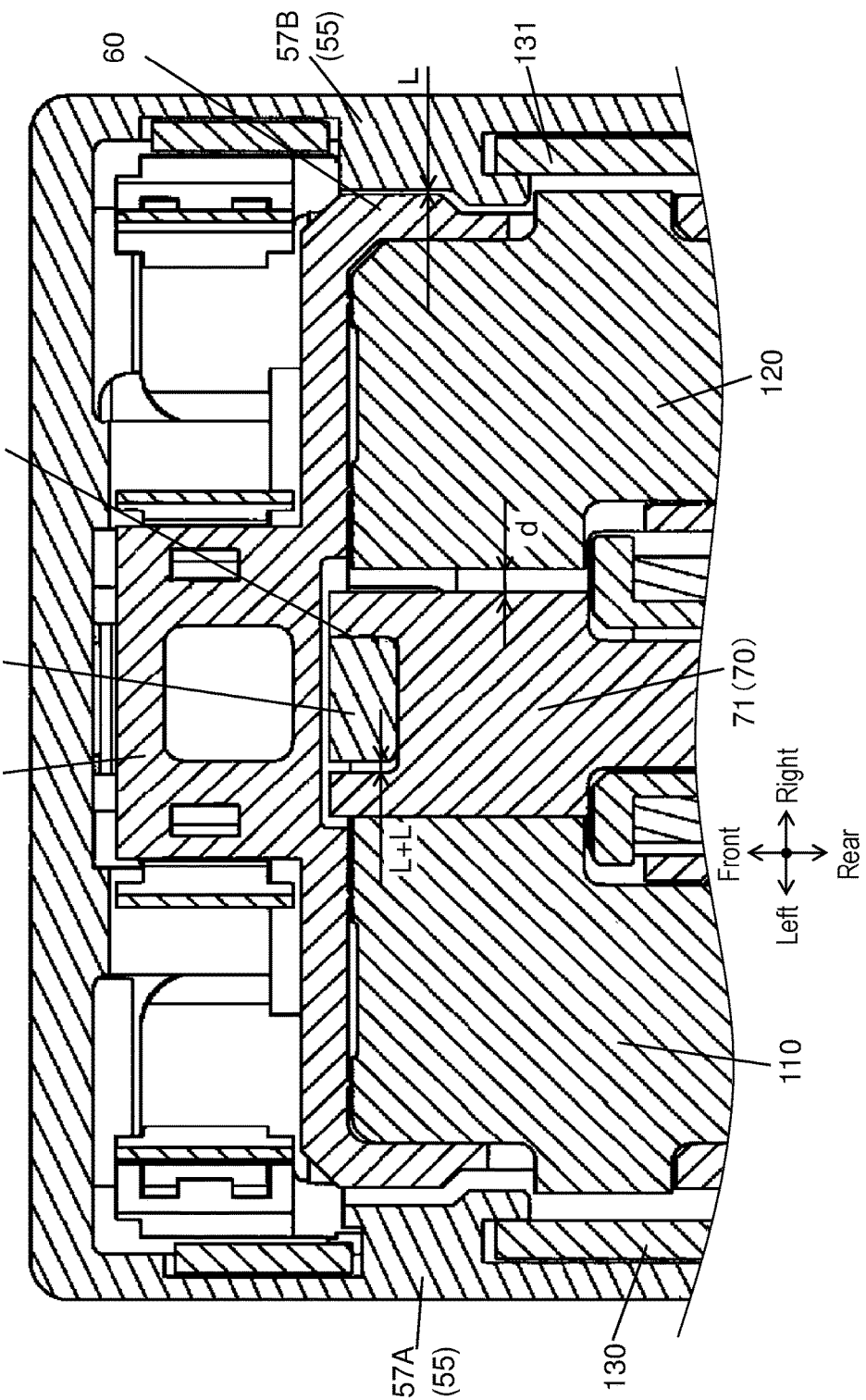
FIG. 9B is a partial enlarged view of FIG. 9A.
Figure 10:
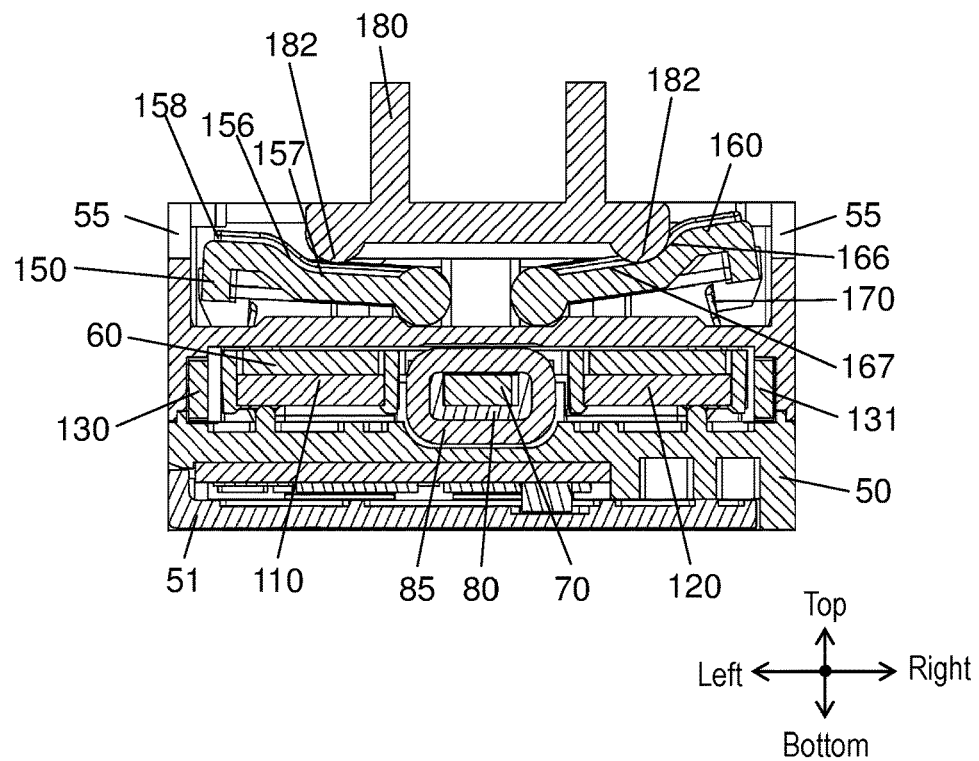
FIG. 10 is a cross-sectional view taken along the vertical direction of the power generation device when the state transitions from the first state to the second state.
Figure 11:
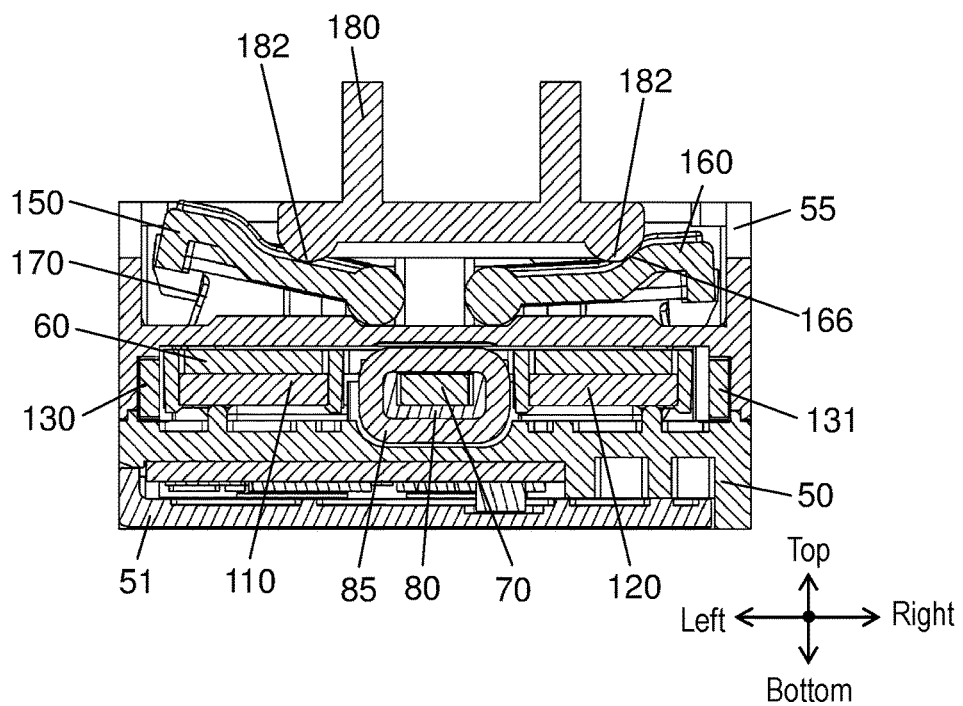
FIG. 11 is a cross-sectional view taken along the vertical direction of the power generation device when the state transitions from the first state to the second state.
Figure 12A:
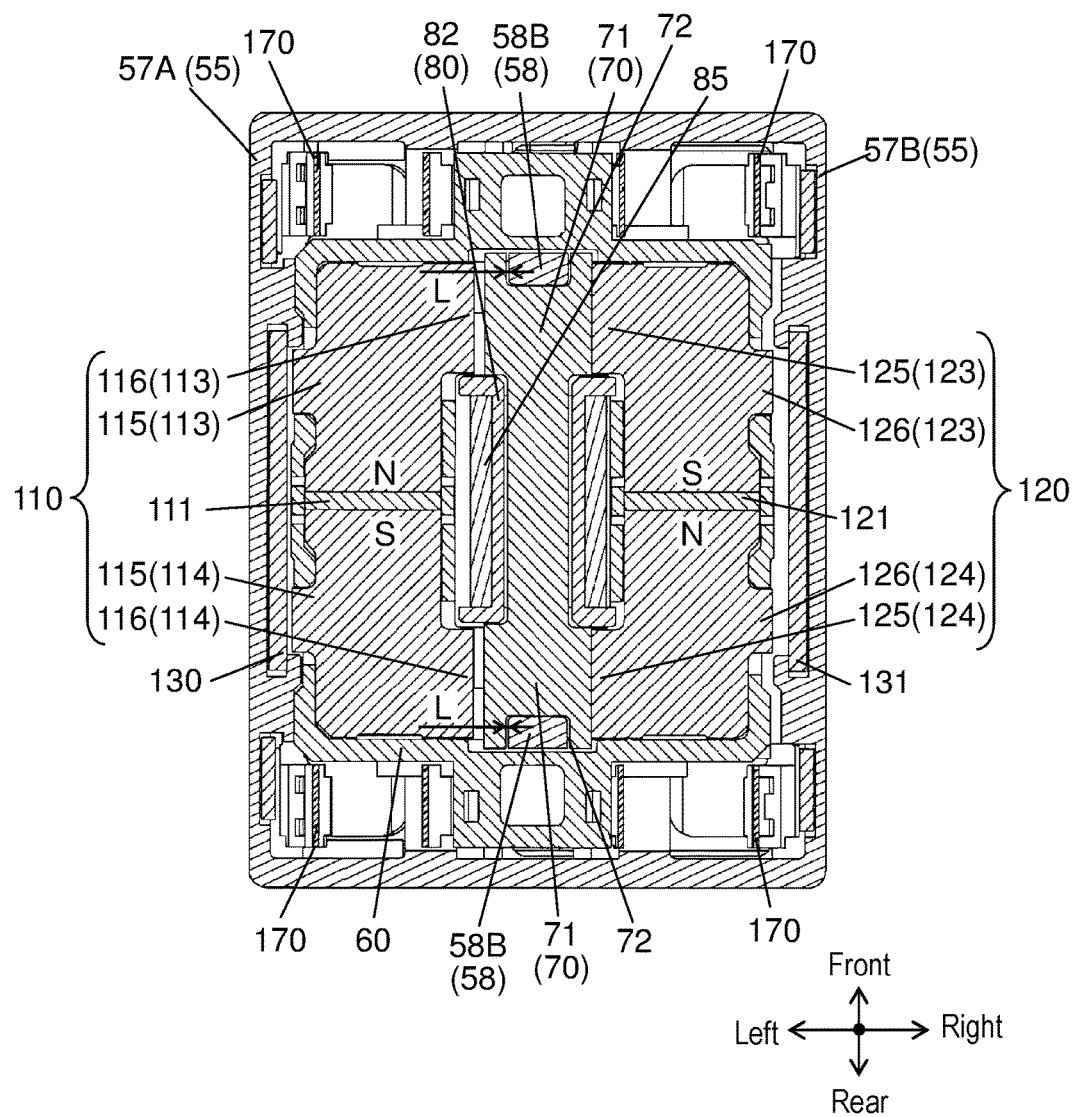
FIG. 12A is a cross-sectional view taken along the horizontal direction of the power generation device in the second state.
Figure 12B:
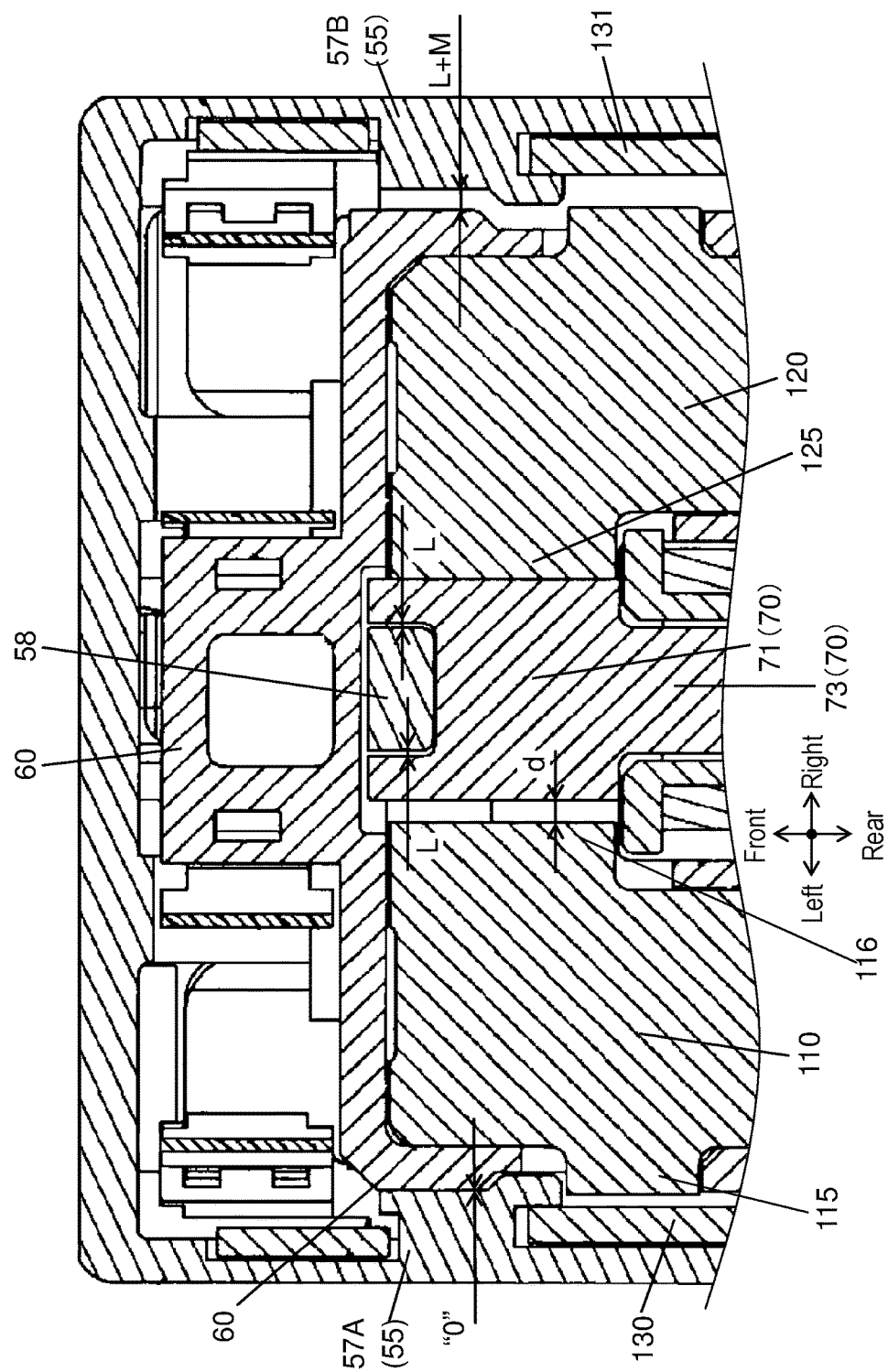
FIG. 12B is a partial enlarged view of FIG. 12A.
Figure 13:
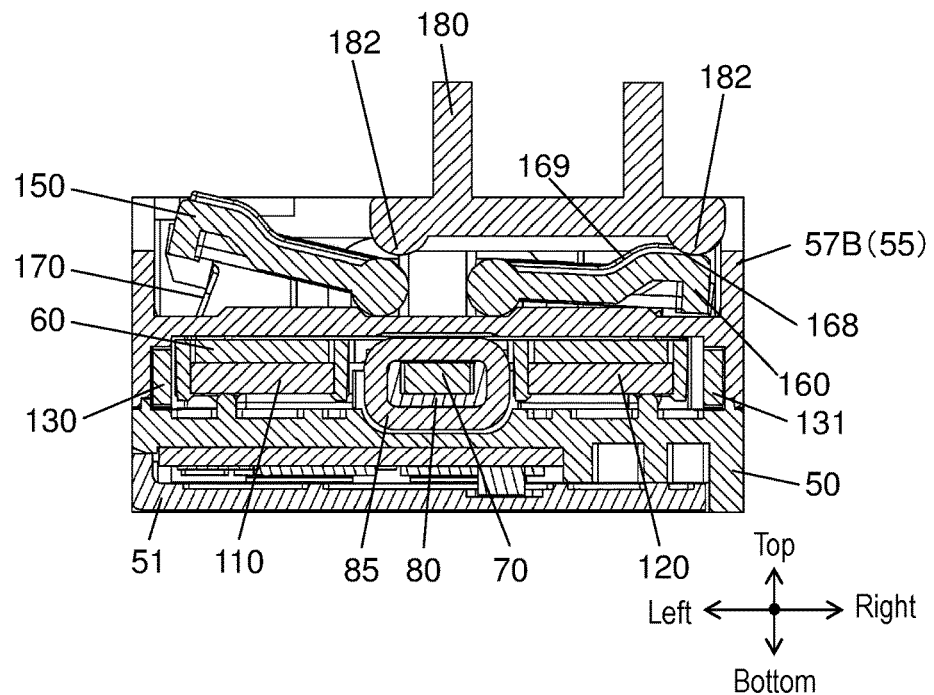
FIG. 13 is a cross-sectional view taken along the vertical direction of the power generation device in the second state.
Figure 14:
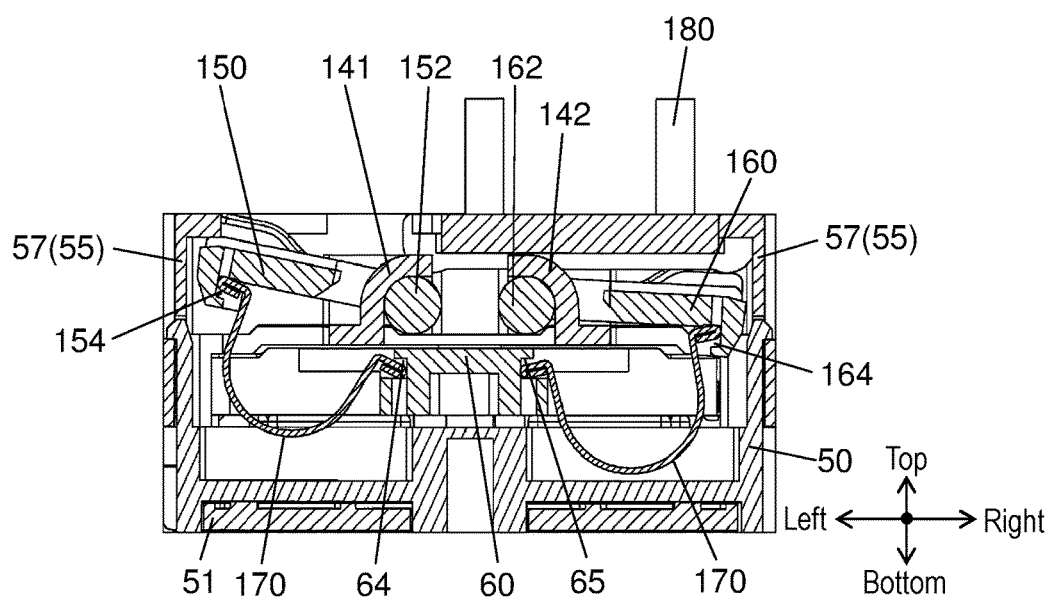
FIG. 14 is a cross-sectional view taken along the vertical direction of the power generation device in the second state.
Figure 15:
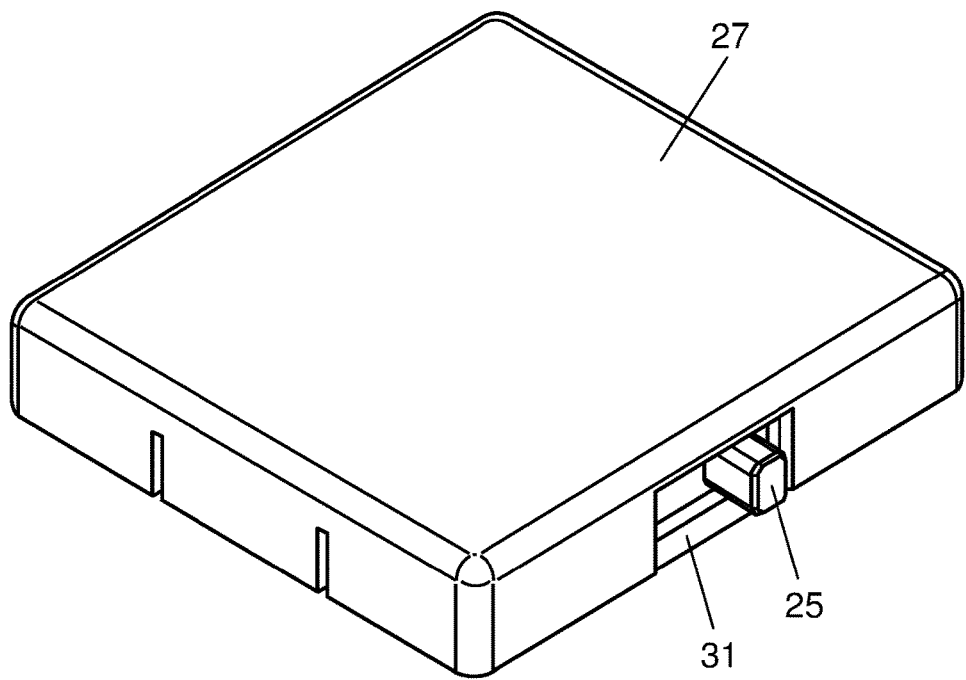
FIG. 15 is an exterior perspective view of a conventional power generation device.
Figure 16:
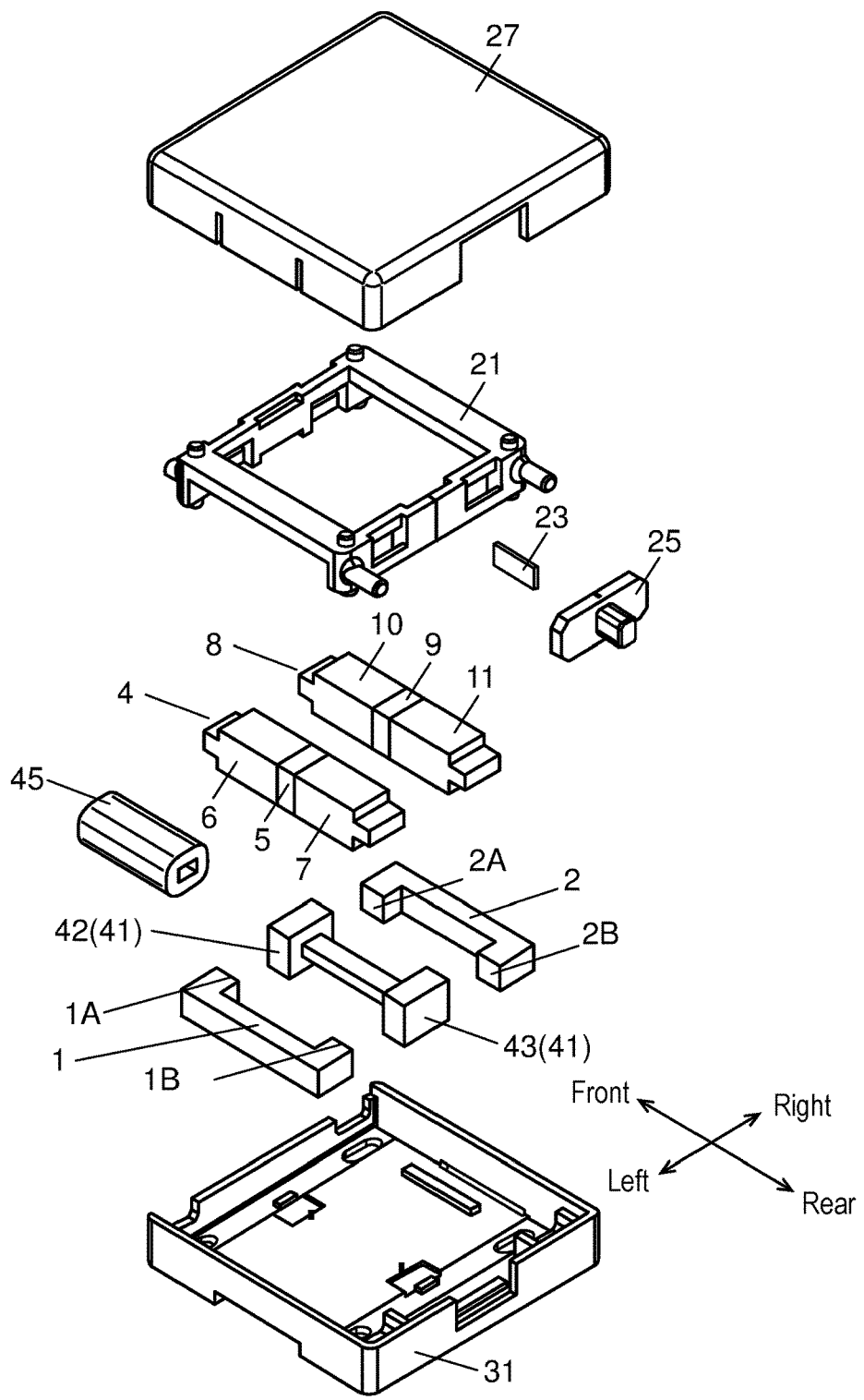
FIG. 16 is an exploded perspective view of the conventional power generation device.
Figure 17:
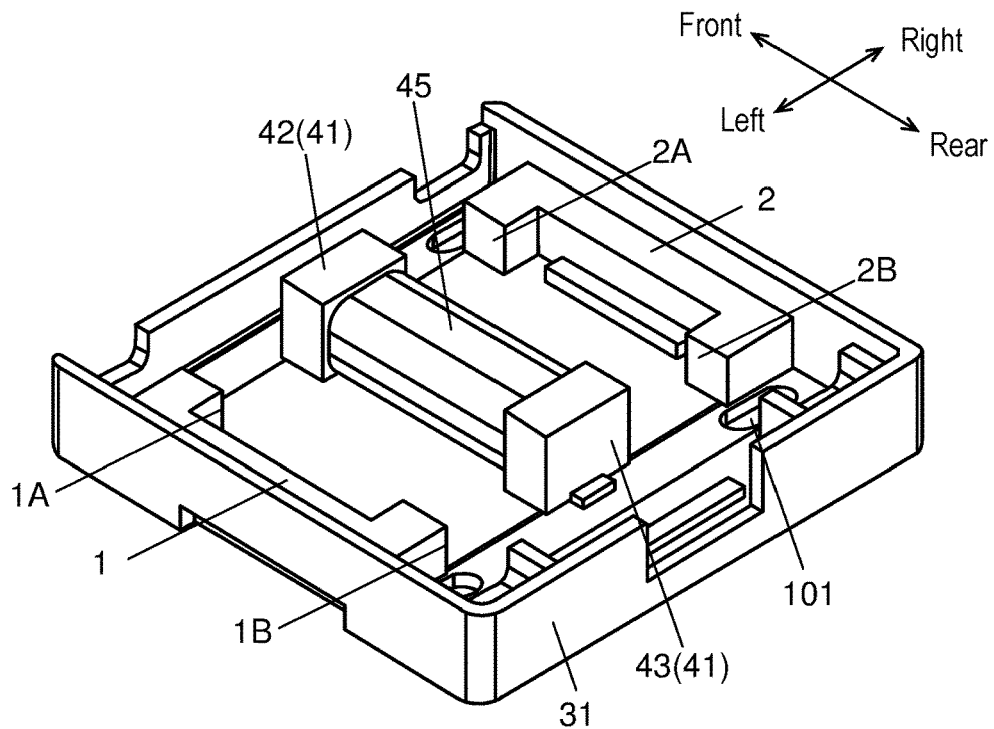
FIG. 17 is a perspective view of a main part in a fixed-side component in the conventional power generation device.
Figure 18:
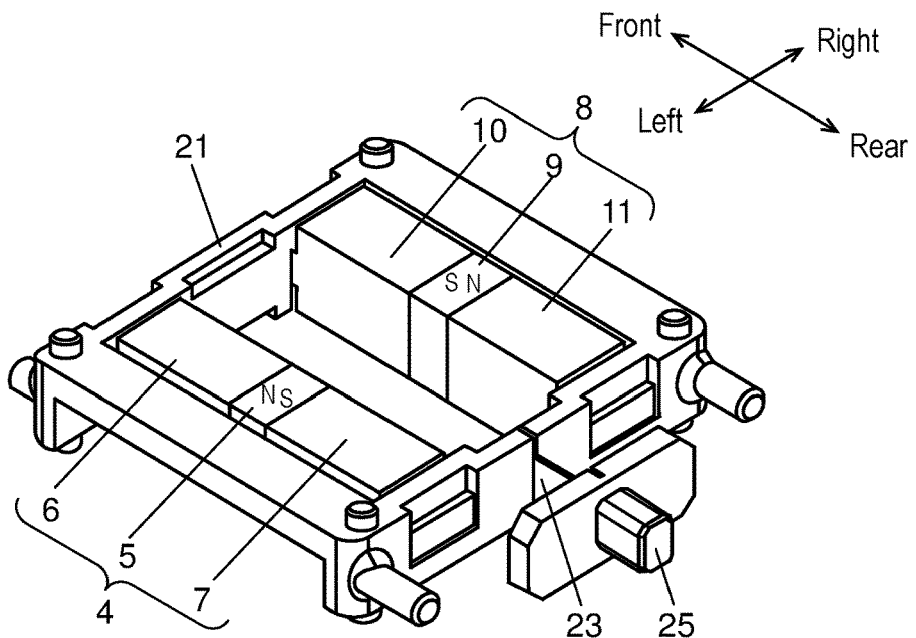
FIG. 18 is a perspective view of a main part in a movable-side component in the conventional power generation device.
Figure 19:
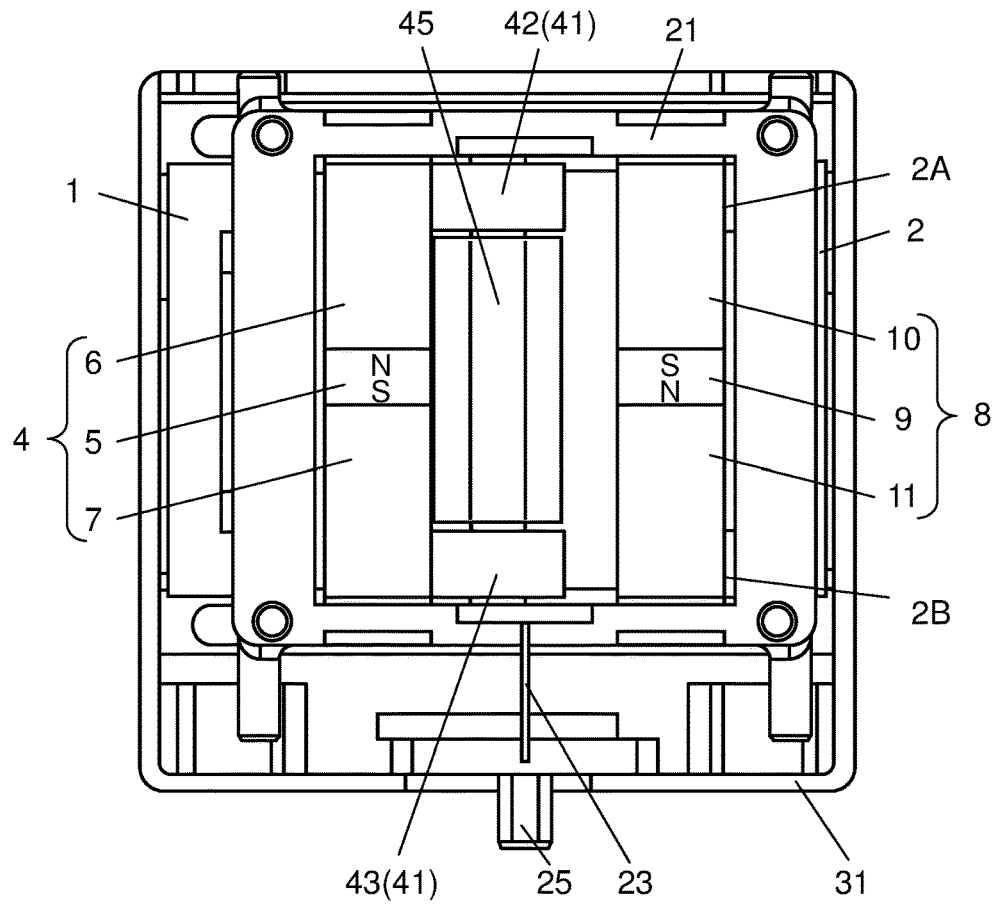
FIG. 19 is a top view showing the first state in the conventional power generation device.
Figure 20:
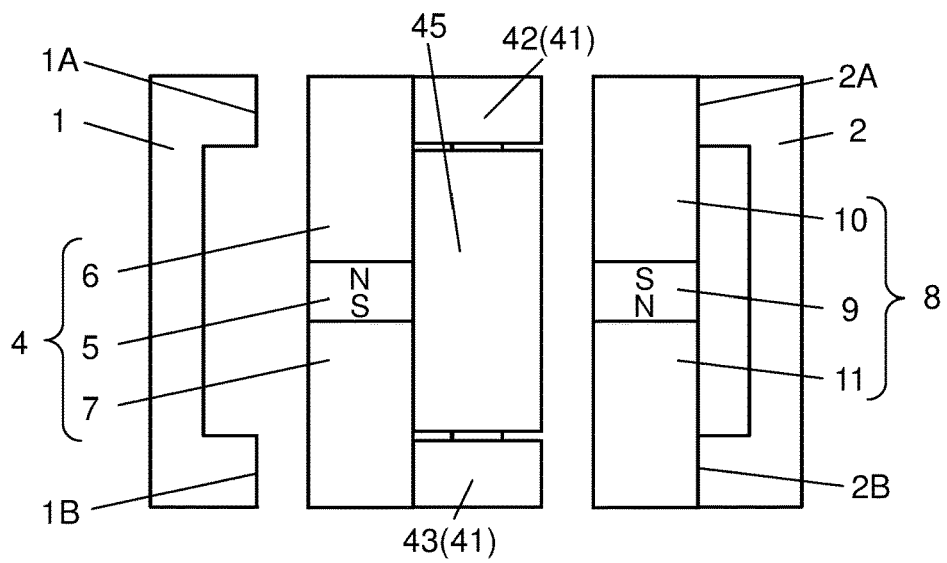
FIG. 20 is a schematic diagram showing the positional relationship between magnet members and yokes in the first state in the conventional power generation device.
Figure 21:
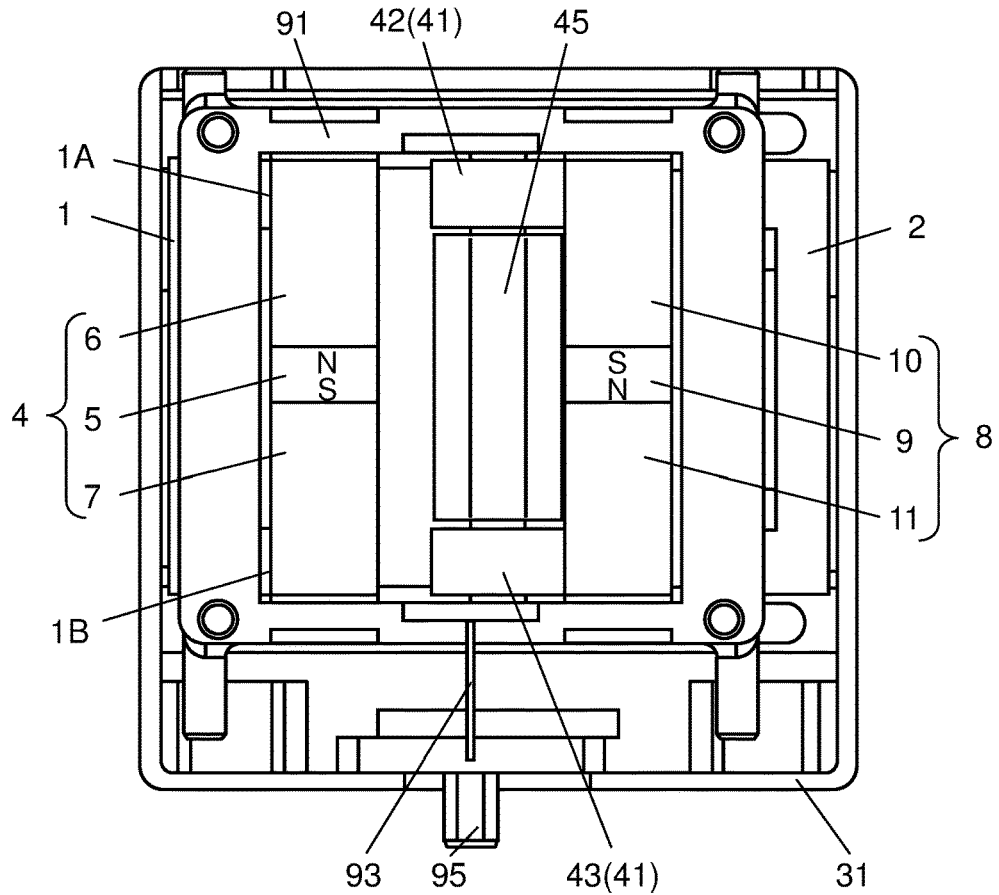
FIG. 21 is a top view showing the second state of the conventional power generation device.
Figure 22:
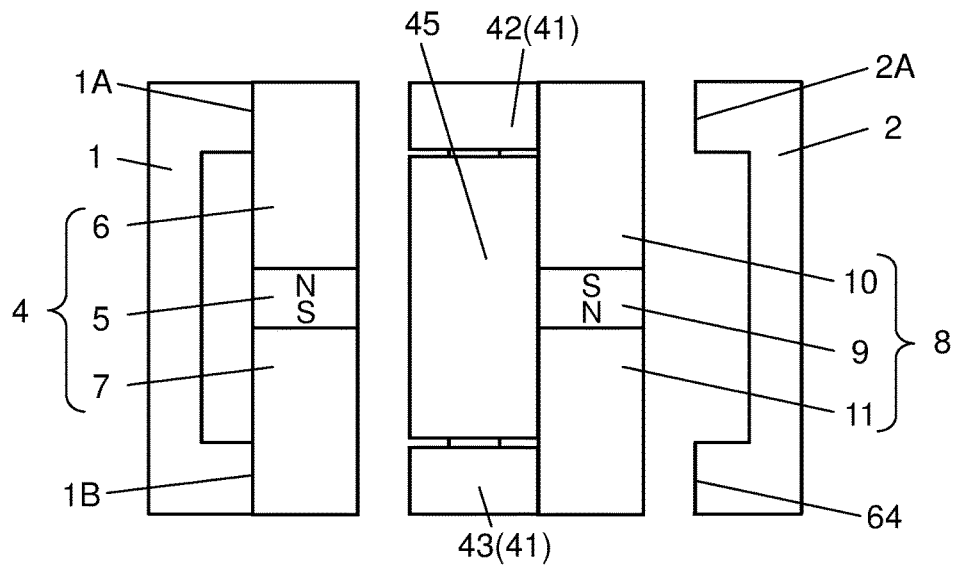
FIG. 22 is a schematic diagram showing the positional relationship between the magnet members and the yokes in the second state of the conventional power generation device.

FIGS. 9B and 9C are partial enlarged views of FIG. 9A. FIG. 10 is a cross-sectional view taken along the vertical direction of the power generation device when the state transitions from the first state to the second state. FIG. 11 is a cross-sectional view taken along the vertical direction of the power generation device when the state transitions from the first state to the second state. FIG. 12A is a cross-sectional view taken along the horizontal direction of the power generation device in the second state. FIG. 12B is a partial enlarged view of FIG. 12A. FIGS. 13 and 14 are cross-sectional views taken along the vertical direction of the power generation device in the second state.

Note that, in the present exemplary embodiment, the structure switching the direction of a magnetic flux flowing in center yoke 70 is referred to as a magnetic circuit structuring unit, and the magnetic circuit structuring unit includes at least first magnet member 110, second magnet member 120, center yoke 70, coil 85, and drive member 60.

<Structure of Power Generation Device>

With reference to FIGS. 1 to 4, a description will be given of the structure of the power generation device according to the present exemplary embodiment. Lower case 50 is quadrangular as seen from above, and made of resin. Below lower case 50, lid plate 51 is mounted. Between the lower surface of lower case 50 and lid plate 51, wiring board 52 having electric circuitry is disposed. At the outer edges of lower case 50 on the right and left sides, holders 50A each having a nail are provided so as to project upward. Lower case 50 is coupled to resin-made upper case 55 by holders 50A.

The outer shape of upper case 55 is a rectangular parallelepiped, and upper case 55 is surrounded by outer wall 57 on the front, rear, left, and right sides. At the center inside upper case 55, intermediate plate 56 is provided. The lower part of upper case 55 than intermediate plate 56 is surrounded by outer wall 57, and the bottom side is opened.

In the space between intermediate plate 56 of upper case 55 and lower case 50, resin-made drive member 60 is disposed. Below drive member 60, center yoke 70, first magnet member 110, second magnet member 120 and the like are disposed.

Drive member 60 is disposed on lower case 50 so as to be capable of slidably shifting in the right-left direction (the horizontal direction). Then, the shifting of drive member 60 in the right-left direction is restricted by drive member 60 abutting on the inner surface of outer wall 57 (57A, 57B) on the right and left sides of upper case 55.

[Details of Structure of Center Yoke 70]

Next, with reference to FIGS. 6 and 7, a description will be given of details of the structure of center yoke 70.

Center yoke 70 is formed by a magnetic plate, and has narrow-width part 73 and wide-width parts 71. Center yoke 70 has an elongated shape with its central part being constricted. Wide-width parts 71 respectively formed on the front side and the rear side are each provided with restriction-target part 72. In other words, restriction-target parts 72 corresponds to constricted portions formed at the opposite ends in the front-rear direction of center yoke 70.

Restriction-target parts 72 formed at wide-width parts 71 are each formed by a cutout punched out in a quadrangle of a prescribed width (dimension B). Note that, while restriction-target parts 72 of the present exemplary embodiment are opened outward, restriction-target parts 72 may not be opened (hole-like). Restriction-target parts 72 are preferably opened, because working is performed easier than with the shape not opened.

As shown in FIG. 6, center yoke 70 is mounted on coil holding member 80. Coil holding member 80 is made of resin.

As shown in FIG. 7, coil holding member 80 has planar part 81 on which center yoke 70 is placed, and sidewall parts 82 projecting upward. Planar part 81 is provided with a plurality of small projections whose cross section is arc-shaped. The small projections extend linearly in the right-left direction and are provided in parallel with each other. Narrow-width part 73 of center yoke 70 is fixed by sidewall parts 82.

Then, in a state where center yoke 70 is disposed on planar part 81 of coil holding member 80, coil 85 is disposed so as to wrap around the outer surface of sidewall parts 82 of coil holding member 80 and narrow-width part 73. The structure shown in FIG. 6 is referred to as center yoke 70 provided with coil 85.

The opposite ends of the coil wire (not shown) of coil 85 are respectively connected to corresponding terminals 87. As shown in FIG. 7, each terminal 87 is made of a conductive spring member bent in U-shape. A plurality of terminals 87 are respectively inserted into terminal attaching parts 83 formed at coil holding member 80.

At the lower plate of each terminal 87, arc-shaped part 88 projecting downward is provided. In the state where terminals 87 are attached inside terminal attaching parts 83, arc-shaped parts 88 project downward than coil holding member 80. Then, the lower ends of arc-shaped parts 88 are elastically in contact with electrodes 53 (see FIG. 3) formed on wiring board 52. Note that, lower case 50 is provided with through holes 54 (see FIG. 3).

At the front end and the rear end of planar part 81 of coil holding member 80, fix-target parts 84 for press-fitting are respectively provided. Fix-target part 84 at the front end is formed by a quadrangular cutout opening forward, and fix-target part 84 at the rear end is formed by a quadrangular cutout opening rearward. Then, the width in the right-left direction of each fix-target part 84 (dimension A) is narrower than the width in the right-left direction of each restriction-target part 72 of center yoke 70 (dimension B).

In center yoke 70 provided with coil 85, the upper part of coil 85 is disposed in coil-use through hole 61 provided at around the central part of drive member 60 (see FIGS. 1 and 3). Coil-use through hole 61 is formed in a quadrangular shape, to vertically penetrate through drive member 60 at around the central portion. Note that, though details will be described later, center yoke 70 provided with coil 85 is integrated with upper case 55.

[Details of Magnetic Circuit Structuring Unit]

Subsequently, with reference to FIGS. 1, 3, and 4 and FIGS. 5A to 5D, a description will be given of details of the magnetic circuit structuring unit. Note that, FIGS. 5B to 5D are partial enlarged views of FIG. 5A.

First magnet member 110 is structured by permanent magnet 111 having a shape of a rectangular parallelepiped, first magnetic body 113 fixed to the front surface of permanent magnet 111, and first magnetic body 114 fixed to the rear surface of the permanent magnet 111. First magnetic bodies 113, 114 are soft magnetic bodies. In permanent magnet 111, the side where first magnetic body 113 is fixed is the N-pole, and the side where first magnetic body 114 is fixed is the S-pole.

First magnetic body 113 has first projecting part 115 projecting in the left direction, and second projecting part 116 projecting in the right direction. Further, first magnetic body 114 has first projecting part 115 projecting leftward and second projecting part 116 projecting rightward. Two first projecting parts 115 are provided so as to be capable of sticking to first auxiliary yoke 130. Further, two second projecting parts 116 are provided so as to be capable of abutting on the left end surfaces of wide-width parts 71 of center yoke 70.

Second magnet member 120 is structured by permanent magnet 121 having a shape of a rectangular parallelepiped, second magnetic body 123 fixed to the front surface of permanent magnet 121, and second magnetic body 124 fixed to the rear surface of permanent magnet 121. Second magnetic bodies 123, 124 are soft magnetic bodies. In permanent magnet 121, the side where second magnetic body 123 is fixed is the S-pole, and the side where second magnetic body 124 is fixed is the N-pole.

Second magnetic body 123 has third projecting part 125 projecting in the left direction, and fourth projecting part 126 projecting in the right direction. Further, second magnetic body 124 has third projecting part 125 projecting leftward and fourth projecting part 126 projecting rightward. Two third projecting parts 125 are provided so as to be capable of abutting on the right end surfaces of wide-width parts 71 of center yoke 70. Further, two fourth projecting parts 126 are provided so as to be capable of sticking to second auxiliary yoke 131.

Then, first magnet member 110 and second magnet member 120 are disposed on the lower surface of drive member 60. A prescribed interval is set between first magnet member 110 and second magnet member 120. Between first magnet member 110 and second magnet member 120, center yoke 70 provided with coil 85 is disposed.

Drive member 60 holding first magnet member 110 and second magnet member 120 is placed on lower case 50. The height of horizontal planes of first magnet member 110 and second magnet member 120 is identical to the height of the horizontal plane of center yoke 70 (see FIG. 1). First magnet member 110 is disposed on the left side of center yoke 70, and second magnet member 120 is positioned on the right side of center yoke 70.

[Details of Structure of Drive Member 60]

As shown in FIG. 3, drive member 60 has two extending parts 63 respectively extending frontward and rearward. Further, first engaging parts 64, 65 are respectively provided on the right end and the left end at the top of each of extending part 63. First engaging parts 64, 65 are in the same shape being symmetric about a line between the right and left sides. Further, drive member 60 has quadrangular holes 67 between coil-use through hole 61 and front extending part 63, and between coil-use through hole 61 and rear extending part 63, respectively.

[Details of Structure of Center Yoke 70 Provided with Coil 85 and Upper Case 55]

Next, a description will be given of the structure in which center yoke 70 provided with coil 85 and upper case 55 are integrated.

As shown in FIG. 4, at the lower surface of intermediate plate 56 of upper case 55, two staged projections 58 projecting downward are provided. Staged projections 58 are provided inside outer wall 57. Further, staged projections 58 are provided substantially in parallel to the front and rear side of outer wall 57. Each staged projection 58 has two stage parts, and structured by base part 58A, intermediate part 58B, and tip part 58C. Base part 58A is disposed at the lower surface of intermediate plate 56. The very tip part in the downward direction of staged projection 58 is tip part 58C. Intermediate part 58B is positioned between tip part 58C and base part 58A.

The cross section taken along the horizontal direction of each of base part 58A, intermediate part 58B, and tip part 58C is a quadrangular shape. The cross section taken along the horizontal direction of each of intermediate part 58B and tip part 58C is smaller than the cross section taken along the horizontal direction of base part 58A.

In each staged projection 58, the width in the right-left direction of base part 58A is greater than the width in the right-left direction of intermediate part 58B or tip part 58C, and base part 58A restricts the position of center yoke 70 in the upward direction. Then, intermediate part 58B restricts the position of center yoke 70 in the right-left direction (the horizontal direction). Intermediate part 58B functions as a fixing part.

Further, dimension C being the width in the right-left direction of intermediate part 58B (the fixing part) (see FIG. 4) is smaller than dimension B being the width in the right-left direction of restriction-target part 72 of center yoke 70 (see FIG. 6). The cross section taken along horizontal direction of tip part 58C is smaller than the cross section taken along horizontal direction of intermediate part 58B (the fixing part), and tip part 58C is formed into a shape so as to be capable of being fitted into fix-target part 84 of coil holding member 80.

Staged projections 58 are disposed in quadrangular holes 67 of drive member 60 and in restriction-target parts 72 of center yoke 70, and tip parts 58C are fitted into fix-target parts 84 of coil holding member 80. Thus, center yoke 70 provided with coil 85 is integrated in the fixed state below intermediate plate 56 of upper case 55. The lower surface side of planar part 81 of coil holding member 80 is placed on lower case 50.

In the fixed state described above, base parts 58A are disposed in quadrangular holes 67 of drive member 60. Quadrangular holes 67 are provided in a dimension not restraining drive member 60 from shifting in the right-left direction.

Further, in the above-described fixed state, intermediate parts 58B are disposed in restriction-target parts 72 of center yoke 70. Here, since there is a difference between the dimension of each restriction-target part 72 in the right-left direction (dimension B) and the dimension of each intermediate part 58B in the right-left direction (dimension C), as shown in FIG. 5D, in the first state, clearance L is present between the right side surface of intermediate part 58B and restriction-target part 72. Note that, the right and left clearances between intermediate part 58B (the fixing part) and restriction-target part 72 are represented by identical L for the sake of clarity in the present exemplary embodiment, but the clearances are not necessarily identical between the right and left sides.

The distance between the left end surface of narrow-width part 73 of center yoke 70 and coil holding member 80, and the distance between the right end surface of narrow-width part 73 of center yoke 70 and coil holding member 80 must be equal to or greater than clearance L.

While coil holding member 80 is fixed to upper case 55, center yoke 70 is not fixed to coil holding member 80 or upper case 55.

In the first state, center yoke 70 can shift leftward at least by clearance L.

Note that, in the present exemplary embodiment, as shown in FIG. 4, intermediate part 58B and tip part 58C each have a quadrangular shape, and intermediate part 58B and tip part 58C are identical to each other in the dimension in the front-rear direction while being different in the width dimension in the right-left direction. This structure is preferable in that center yoke 70 provided with coil 85 can be attached easily, and the size of tip part 58C can be secured.

[Structure of Drive Bodies 150, 160, Slide Member 180]

Next, with reference to FIGS. 1, 3, 4, 5A, and 8, a description will be given of details of the drive bodies and the like of the power generation device.

At the inner surface positions of outer wall 57 (57A, 57B) corresponding to the right and left sides of upper case 55, slit-like grooves 59 (see FIGS. 4 and 5A) are provided, and first auxiliary yokes 130, 131 made of magnetic plates are respectively inserted into slit-like grooves 59. The lower edges of first auxiliary yokes 130, 131 are placed on lower case 50.

Further, as shown in FIG. 3, upper case 55 has a pair of bearing parts at each of the front end and the rear end on intermediate plate 56. The pairs of bearing parts are structured by bearing parts 141, 142.

Two bearing parts 141 rotatably hold the opposite ends of cylindrical shaft part 152 of drive body 150, and two bearing parts 142 rotatably hold the opposite ends of cylindrical shaft part 162 of drive body 160.

Two second engaging parts 154 are provided at the lower surface of drive body 150 (see FIG. 4). Second engaging parts 154 each are provided so as to correspond to first engaging parts 64 of drive member 60, respectively. Then, as shown in FIG. 8, the ends of U-shaped spring 170 engage with paired first engaging part 64 and second engaging part 154. That is, left drive body 150 is connected to drive member 60 via two U-shaped springs 170. The projecting direction of U-shaped springs 170 is downward.

Similarly to drive body 150, two second engaging parts 164 are provided at the lower surface of drive body 160 (see FIG. 4). Second engaging parts 164 each are provided so as to correspond to first engaging parts 65 of drive member 60, respectively. Then, as shown in FIG. 8, the ends of U-shaped spring 170 engage with paired first engaging part 65 and second engaging part 164. That is, right drive body 160 is connected to drive member 60 via two U-shaped springs 170. The projecting direction of U-shaped springs 170 is downward.

In the present exemplary embodiment, U-shaped springs 170 are each made of a spring plate of a prescribed width, and four U-shaped springs 170 are identically shaped. Note that, as shown in FIG. 3, it is preferable that the ends of each U-shaped spring 170 are folded back, because it can prevent shaving. Note that, the positions where extending parts 63 are disposed and the shape of drive member 60 are set such that the U-shaped portion of each U-shaped spring 170 can be disposed.

Drive body 150 is mounted so as to be rotatable about cylindrical shaft part 152. Drive body 160 is mounted so as to be rotatable about cylindrical shaft part 162.

Further, guiding parts are provided at the inner side on the upper end of outer wall 57 formed at the front and rear ends of upper case 55. Then, slide member 180 is mounted in the guiding parts (see FIGS. 1, 2, and 8). Slide member 180 is mounted in upper case 55 so as to be horizontally slidable in the right-left direction while being guided by the guiding parts.

Slide member 180 has two pressing parts 182 at its lower surface. One pressing part 182 is disposed on the left end of slide member 180, and other pressing part 182 is disposed on the right end of slide member 180. Each pressing part 182 has a semicylindrical shape extending in the front-rear direction (see FIG. 4). Pressing parts 182 are provided to project downward. Each pressing part 182 functions as a component that presses down corresponding right drive body 150 or left drive body 160 when slide member 180 shifts in the right-left direction.

[Details of Structure of Drive Bodies 150, 160]

Next, with reference to FIGS. 1, 3, and 4, a further detailed description will be given of the structure of drive body 150.

As shown in FIGS. 1 and 3, the central portion of the upper surface of left drive body 150 pressed by left pressing part 182 has first surface 156, second surface 157, and third surface 158. Third surface 158 is positioned on the left side, and near to slide member 180. Further, second surface 157 is positioned on the right side, and far from slide member 180. Then, first surface 156 is an inclined surface connecting between third surface 158 and second surface 157. Note that, at the connection portion between first surface 156 and third surface 158, no corner is formed and the connection portion is a smooth connection surface. The same holds true for the connection portion between second surface 157 and first surface 156. Further, at the upper surfaces of second surface 157, first surface 156, third surface 158, linear projections 159 extending in the right-left direction are provided (see FIG. 3). The height of linear projections 159 is identical. At the portions of pressing parts 182 opposing to linear projections 159, clearance grooves 182A as shown in FIG. 4 are provided. It is preferable to dispose linear projections 159 in clearance grooves 182A, because shifting of slide member 180 in the right-left direction becomes smooth.

Similarly to drive body 150, the central portion of the upper surface of right drive body 160 pressed by right pressing part 182 has first surface 166, second surface 167, and third surface 168. Third surface 168 is positioned on the right side, and near to slide member 180. Further, second surface 167 is positioned on the left side, and far from slide member 180. Then, first surface 166 is an inclined surface connecting between third surface 168 and second surface 167. Note that, at the connection portion between first surface 166 and third surface 168, no corner is formed and the connection portion is a smooth connection surface. The same holds true for the connection portion between second surface 167 and first surface 166. Further, at the upper surface of second surface 167, first surface 166, and third surface 168, linear projections 169 extending in the right-left direction are provided. Since linear projections 169 are similar to linear projections 159 described above, the description thereof is omitted.

The power generation device according to the present exemplary embodiment is structured as described above.

<Description of Operation of Power Generation Device>

Subsequently, a description will be given of the operation when the state of the power generation device according to the present exemplary embodiment transitions from the first state to the second state.

[First State]

FIGS. 1, 5A, 5D, and 8 show the first state. In the first state, slide member 180 abuts on left outer wall 57A of upper case 55, and is positioned at the leftmost position. As shown in FIG. 1, left pressing part 182 abuts on third surface 158 of left drive body 150. At this time, left drive body 150 is rotated counterclockwise as seen from the front side, and being pressed down. On the other hand, as shown in FIGS. 5A and 5D, in connection with drive member 60, the right side surface of drive member 60 abuts on the inner surface of right outer wall 57B (indicated by "0" in FIG. 5D). Note that, the left side surface of drive member 60 is spaced apart from the inner surface of corresponding left outer wall 57A.

In the first state, in second magnet member 120 held by drive member 60, the state where fourth projecting parts 126 are in close proximity to second auxiliary yoke 131 is entered (a sticking state). Further, third projecting parts 125 are spaced apart from the right end surfaces of wide-width parts 71 of center yoke 70.

On the other hand, in first magnet member 110, the state where second projecting parts 116 abut on wide-width parts 71 of center yoke 70 is entered (the sticking state). Further, first projecting parts 115 are spaced apart from second auxiliary yoke 131.

As described above, in restriction-target parts 72 of center yoke 70, intermediate parts 58B of staged projections 58 are disposed. Further, in the first state, between the right side surface of each intermediate part 58B and each restriction-target part 72, clearance L exists. While FIG. 5D shows that clearance L also exists on the left side of intermediate part 58B, it is not necessarily clearance L as to the left side.

In the first state, in connection with center yoke 70, the magnetic flux of first magnet member 110 flows via the route from first magnetic body 113 to front wide-width part 71, then to rear wide-width part 71 and returning to first magnetic body 114.

Further, in the first state, as shown in FIG. 8, in connection with four U-shaped springs 170, two U-shaped springs 170 for left drive body 150 are in a substantially stretched state (a slightly flexed state), and bias drive member 60 slightly rightward. On the other hand, two U-shaped springs 170 for right drive body 160 are in a completely stretched state. That is, since right pressing part 182 is not in contact with right drive body 160, right drive body 160 is in the state before being pressed down, having its right end risen. Note that, with the structure of the present exemplary embodiment, in the first state being the operation stop position and in the second state which will be described later, it is structured such that four U-shaped springs 170 are in the substantially stretched state (the slightly flexed state) or in the stretched state. Such a structure is preferable because four U-shaped spring 170 are less prone to deteriorate by creep, and the spring performance of four U-shaped springs 170 is maintained for a long period.

[Transition from First State to Second State (First Step)]

Next, when slide member 180 is shifted rightward, left pressing part 182 shifts from third surface 158 of left drive body 150 onto first surface 156.

From a time point during the rightward shifting of slide member 180, right pressing part 182 abuts on second surface 167 of right drive body 160, and shifts rightward on second surface 167. In accordance with the shifting of slide member 180, the right end of right drive body 160 lowers, and right drive body 160 rotates in the clockwise direction.

When drive body 160 gradually rotates as described above, two U-shaped springs 170 for drive body 160 also gradually flex. Then, in the present exemplary embodiment, drive member 60 starts to shift leftward by that spring force. That is, drive body 160 that is capable of rotating connects to drive member 60 via U-shaped springs 170, and spring force is accumulated in U-shaped springs 170 in accordance with the rotation of drive body. Then, the drive member horizontally shifts by the spring force. The spring force accumulated in U-shaped springs 170 for drive body 160 at this time is set to be greater than the sticking force between second magnet member 120 and second auxiliary yoke 131. Hence, drive member 60 shifts leftward (in the first direction) by this spring force.

Note that, in the present exemplary embodiment, since the second magnet member 120 and second auxiliary yoke 131 are in close proximate to each other but not abut on each other in the first state, the operations described above can be easily realized.

When drive member 60 starts to shift leftward, the positional relationship among center yoke 70, first magnet member 110, and second magnet member 120 is the same in the first state. Center yoke 70, first magnet member 110, and second magnet member 120 shift leftward together with drive member 60 while center yoke 70, first magnet member 110, and second magnet member 120 maintain the positional relationship among them identical to that in the first state. When drive member 60 starts to shift leftward (the first state shown in FIG. 5D), center yoke 70 and clearance L are present on the right side of intermediate part 58B. Further, center yoke 70 is not fixed and capable of shifting leftward. Accordingly, while in the sticking state where center yoke 70 and first magnet member 110 abut on each other, firstly drive member 60 shifts leftward by the distance of clearance L.

The description is again given on this matter. Firstly, drive member 60 shifts leftward together with center yoke 70, first magnet member 110, and second magnet member 120 without changing the positional relationship among them, by a distance of clearance L.

Thereafter, since the right side surfaces of intermediate parts 58B abut on the right end surfaces of restriction-target parts 72, shifting leftward of center yoke 70 is restricted and center yoke 70 enters the stop state. This stop state is shown in FIG. 9A (FIG. 9B). As shown in FIGS. 9A and 9B, in the stop state, the left side surfaces of intermediate parts 58B and the left end surfaces of restriction-target parts 72 of center yoke 70 are spaced apart by a clearance (L+L). In other words, the left sides of intermediate parts 58B are spaced apart from center yoke 70. Note that, as described above, center yoke 70 is spaced apart from second magnet member 120. The distance between center yoke 70 and second magnet member 120 is represented by distance d in FIG. 9B. Then, the right side surface of the central main part of drive member 60 is spaced apart by clearance L from the inner surface of right outer wall 57B of upper case 55. At this time, the left side surface of the central main part of drive member 60 is spaced apart from the inner surface of left outer wall 57B of upper case 55.

[Transition from First State to Second State (Second Step)]

Next, a description will be given of the operations after leftward (the first direction) shifting of center yoke 70 is restricted.

When leftward shifting of center yoke 70 is restricted by abutting on restriction-target parts 72 and a stop state is entered, drive member 60 holding first magnet member 110 sticking to center yoke 70 also enters the stop state. The spring force accumulated in U-shaped springs 170 while right pressing part 182 of slide member 180 shifts rightward on second surface 167 of right drive body 160 is smaller than the sticking force between center yoke 70 and first magnet member 110. Therefore, even when right pressing part 182 further shifts rightward on second surface 167 of right drive body 160 after center yoke 70 stops, drive member 60 and the magnetic circuit structuring unit maintains the stop state described above.

Note that, left pressing part 182 of slide member 180 shifts from third surface 158 of left drive body 150 onto first surface 156, and thereafter shifts to a position above second surface 157. FIG. 10 shows the state immediately before right pressing part 182 shifts from second surface 167 to first surface 166. In the state shown in FIG. 10, two U-shaped springs 170 for left drive body 150 are stretched, and slightly rotated clockwise such that the left end of left drive body 150 is raised.

From the state shown in FIG. 10, right pressing part 182 of slide member 180 shifts rightward on first surface 166 of right drive body 160. Then, since first surface 166 is structured by the inclined surface directed diagonally right above, as shown in FIG. 11, right drive body 160 is largely pressed downward. In accordance with right drive body 160 being pressed downward, two U-shaped springs 170 for right drive body 160 largely flex in a short time period.

It is designed such that the spring force accumulated in U-shaped springs 170 at this time becomes greater than the sticking force between first magnet member 110 and center yoke 70. When the accumulated spring force becomes greater than the sticking force between first magnet member 110 and center yoke 70, the sticking portion between first magnet member 110 and center yoke 70 is separated, and drive member 60 further shifts horizontally leftward (in the first direction).

In other words, by the component of force of the spring force in the horizontal direction allows drive member 60 to further shift leftward. This shift distance is represented by distance M in FIG. 12B.

Note that, by virtue of provision of first surface 166 being an inclined surface, U-shaped springs 170 can be largely flexed in a short time period in the short distance within the inclined surface. That is, by setting the inclination or length of the inclined surface as appropriate, even when the spring force of U-shaped springs 170 or the magnetic force of magnet members 110, 120 vary, the spring force necessary near the intermediate position of the inclined surface can be easily obtained. Further, as to left drive body 150 also, first surface 156 being an inclined surface is provided based on the same reason.

When first magnet member 110 and center yoke 70 are spaced apart and drive member 60 again horizontally shifts leftward by the spring force, first magnet member 110 and second magnet member 120 held by drive member 60 shift leftward in synchronization with each other. Then, first magnet member 110 becomes spaced apart from center yoke 70, and second magnet member 120 approaches center yoke 70.

At this time, as shown in FIG. 9B, center yoke 70 is in a state where the left sides of intermediate parts 58B are spaced apart (represented by L+L in FIG. 9B). That is, center yoke 70 is capable of shifting rightward (the second direction). As second magnet member 120 approaches in the first direction, center yoke 70 is more greatly influenced by the magnetic force of second magnet member 120. Thus, center yoke 70 shifts rightward (the second direction), and center yoke 70 and second magnet member 120 stick to each other.

That is, as shown in FIG. 9C, by second magnet member 120 shifting in the first direction by distance M and center yoke 70 shifting in the second direction, distance d between center yoke 70 and second magnet member 120 is eliminated. This state is shown in FIG. 12B.

Further, the left side surface of the central main part of drive member 60 shifting leftward (the first direction) abuts on the inner surface of left outer wall 57A and stops (indicated by "0" in FIG. 12B). Note that, the shifting described above occurs momentarily. The state where drive member 60 shifts leftward and stops, and where center yoke 70 and second magnet member 120 stick to each other is referred to as the second state. The power generation device in the second state is shown in FIG. 12A. FIG. 12B is a partial enlarged view of FIG. 12A. FIG. 12A (FIG. 12B) is a cross-sectional view taken along the horizontal direction.

Further, FIG. 11 is a cross-sectional view taken along the vertical direction of the power generation device according to the present exemplary embodiment in the state between FIG. 10 and FIG. 13.

In FIG. 11, the same constituent elements are denoted by identical reference characters, and the description thereof is omitted.

[Second State]

When drive member 60 shifts leftward and enters the stop state, as shown in FIGS. 12A and 12B, first magnet member 110 is in the sticking state where first projecting parts 115 are in close proximity to first auxiliary yoke 130. Second projecting parts 116 are spaced apart from the left end surfaces of wide-width parts 71 of center yoke 70. Second magnet member 120 is in the sticking state where third projecting parts 125 abut on the right end surfaces of wide-width parts 71 of center yoke 70. Fourth projecting parts 126 are spaced apart from second auxiliary yoke 131.

Ultimately, as shown in FIGS. 13 and 14, slide member 180 abuts on right outer wall 57B and stops at the right end position. In the state shown in FIG. 13 (the second state), right pressing part 182 has been shifted from first surface 166 onto third surface 168.

In the second state, right pressing part 182 of slide member 180 abuts on third surface 168 of right drive body 160. At this time, drive body 160 rotates in the clockwise direction, and in the pressing down state. In the state shown in FIG. 13, drive member 60 is in the state shown in FIGS. 12A and 12B. That is, in connection with drive member 60, the left side surface of the central main part abuts on the inner surface of left outer wall 57A and stops. Two U-shaped springs 170 for right drive body 160 in the substantially stretched state (the slightly flexed state) provide the spring force with which drive member 60 is biased slightly leftward. Two U-shaped springs 170 for left drive body 150 are completely stretched, and left pressing part 182 is not in contact with left drive body 150. Accordingly, left drive body 150 is in the state before pressing down, i.e., the left end is raised.

In the second state, the magnetic circuit structuring unit is maintained in the state shown in FIG. 12A (FIG. 12B) described above. That is, center yoke 70 sticks to second magnet member 120, and clearance L is present between the left side surfaces of intermediate parts 58B positioned in restriction-target parts 72 of center yoke 70 and the left end surfaces of restriction-target parts 72, in other words, at the left position as seen from intermediate parts 58B.

Then, in the second state, second projecting parts 116 of first magnet member 110 are spaced apart from the left end surfaces of wide-width parts 71 of center yoke 70 (represented by "d" in FIG. 12B). Further, the sticking state is entered where third projecting parts 125 of second magnet member 120 abut on the right end surfaces of wide-width parts 71 of center yoke 70.

In the second state, in connection with center yoke 70, the magnetic flux of second magnet member 120 flows via the route from second magnetic body 124 to wide-width parts 71, and returning to second magnetic body 123. In the second state, the direction in which the magnetic flux flows is reverse to that in the first state.

That is, when the state transitions from the first state to the second state, the direction of the magnetic flux flowing through center yoke 70 changes. In accordance with the change in the magnetic flux flow, electromotive force is generated at coil 85. The electromotive force generated at coil 85 is supplied to electrodes 53 provided at wiring board 52 via terminals 87. Then, the electric circuitry of wiring board 52 is actuated. The actuation content of the electric circuitry may be, for example, generation and transmission of a prescribed wireless signal.

The power generation device according to the present exemplary embodiment includes, as can be seen from the foregoing description: a first magnet member; a second magnet member having its N-pole reversely disposed relative to the first magnet member; a center yoke capable of horizontally shifting, and disposed between the first magnet member and the second magnet member; a coil disposed at the outer circumference of the center yoke; and a drive member horizontally shifting while holding the first magnet member and the second magnet member. Then, the drive member and the center yoke horizontally shift in a first direction. After the horizontal shift in the first direction of the center yoke stops, the drive member further horizontally shifts in the first direction, and the center yoke horizontally shifts in a second direction opposite to the first direction.

That is, the power generation device according to the present exemplary embodiment is structured such that center yoke 70 itself can shift toward second magnet member 120 (the second direction) during transition from the first state to the second state. A reduction in sticking time can be achieved by the shifting amount of center yoke 70 in the second direction, and the time required for changing the flow of the magnetic flux of center yoke 70 can be reduced. Hence, the power generation device that easily obtains great electromotive force can be provided.

Further, in the power generation device according to the present exemplary embodiment, restriction-target parts 72 are provided at center yoke 70 for restricting the operation of center yoke 70. In restriction-target parts 72, intermediate parts 58B (the fixing parts) of staged projections 58 are respectively disposed. With such a structure, while drive member 60 is horizontally shifting, center yoke 70 that shifts in the horizontal direction (the first direction) similarly to drive member 60 stops. This structure is preferable, because the shift distance of center yoke 70 when center yoke 70 is caused to shift in the horizontal direction (the first direction) is easily set by setting of clearance L.

Note that, when the state transitions from the second state to the first state, slide member 180 is shifted leftward. In this operation state, right and left are reversed as compared to the transition from the first state to the second state described above. Since the operations during transition from the second state to the first state are similar to those during transition from the first state to the second state, detailed description thereof is omitted.

When the state transitions from the second state to the first state, center yoke 70 shifts toward first magnet member 110 and sticks to first magnet member 110. Therefore, the effect similar to that in transition from the first state to the second state can be obtained.

As described above, the present invention is characterized in that center yoke 70 itself can shift within a prescribed range, whereby the novel magnetic circuit structuring unit providing great electromotive force can be obtained.

Further, in the present exemplary embodiment, center yoke 70 itself shifts and sticks to first magnet member 110 (or second magnet member 120). Therefore, drive member 60 abuts on resin-made outer wall 57A (or, outer wall 57) and stops. Hence, an additional effect of a reduction in noise at the time when the sticking takes place is obtained.

Note that, the structure of the present invention is not limited to the present exemplary embodiment described above. For example, the shape or formation positions of restriction-target parts 72 of center yoke 70 may be set as appropriate. Also, the fixing parts arranged in restriction-target parts 72 are not limited to staged projections 58 provided at upper case 55.

Further, in the present exemplary embodiment, while the shifting of drive member 60 in the right-left direction is restricted by outer wall 57A (or outer wall 57B) of upper case 55, the present invention is not limited thereto.

Still further, in addition to restriction-target parts 72, the shape of center yoke 70, the shape or structure of first magnet member 110, and second magnet member 120 are not limited to the above-described manner, and may be set as appropriate.

Still further, in the present exemplary embodiment, while drive member 60 and drive bodies 150, 160 are connected by U-shaped springs 170, the employed springs are not limited to U-shaped springs 170.

Still further, as to each of drive bodies 150, 160, the pivotally supported portion may be structured at a portion corresponding to the end position on the right or left side, and the portion corresponding to the central position on the right or left side may be pressed down.

Still further, wiring board 52 is not necessarily included, and solely the magnetic circuit structuring unit may be included. Still further, first auxiliary yoke 130 and second auxiliary yoke 131 may be provided as necessary.

Still further, in describing the present exemplary embodiment, the terms "quadrangle", "quadrangular" are used. However, a strict quadrangle is not meant. The terms "quadrangle", "quadrangular" used in the description of the present exemplary embodiment include an approximate quadrangle having rounded corners.

INDUSTRIAL APPLICABILITY

The power generation device of the present invention exhibits an advantageous effect of providing a power generation device capable of providing great electromotive force, and is useful for various electronic devices.

The invention claimed is:
1. A power generation device comprising:
a first magnet member;
a second magnet member having its N-pole reversely disposed to an N-pole of the first magnet member;
a center yoke capable of horizontally shifting and disposed between the first magnet member and the second magnet member;
a coil disposed at an outer circumference of the center yoke;
a drive member horizontally shifting while holding the first magnet member and the second magnet member; and
a fixing part, wherein
the drive member and the center yoke horizontally shift in a first direction,
after the horizontal shift of the center yoke in the first direction stops, the drive member further horizontally shifts in the first direction, and the center yoke horizontally shifts in a second direction opposite to the first direction,
the center yoke has a restriction-target part,
the fixing part is disposed in the restriction-target part,
a clearance exists between the restriction-target part and the fixing part, and
when the fixing part and the restriction-target part are brought into contact with each other, the horizontal shifting of the center yoke in the first direction stops.

2. The power generation device according to claim 1, further comprising a case, wherein
the case has an outer wall, and
when the drive member and the outer wall are brought into contact with each other, the horizontal shifting of the drive member in the first direction stops.

3. The power generation device according to claim 1, further comprising a spring and a drive body which is rotatable, wherein
the drive body is connected to the drive member via the spring,
a spring force is accumulated on the spring in accordance with rotation of the drive body, and
the spring force causes the drive member to horizontally shift.

4. A power generation device comprising:
a first magnet member;
a second magnet member having its N-pole reversely disposed to an N-pole of the first magnet member;
a center yoke capable of horizontally shifting and disposed between the first magnet member and the second magnet member;
a coil disposed at an outer circumference of the center yoke;
a drive member horizontally shifting while holding the first magnet member and the second magnet member; and
a case, wherein
the drive member and the center yoke horizontally shift in a first direction,
after the horizontal shift of the center yoke in the first direction stops, the drive member further horizontally shifts in the first direction, and the center yoke horizontally shifts in a second direction opposite to the first direction,
the case has an outer wall, and
when the drive member and the outer wall are brought into contact with each other, the horizontal shifting of the drive member in the first direction stops.

5. The power generation device according to claim 4, further comprising a spring and a drive body which is rotatable, wherein the drive body is connected to the drive member via the spring, a spring force is accumulated on the spring in accordance with rotation of the drive body, and the spring force causes the drive member to horizontally shift.

* * * * *